(12) United States Patent
Huggett

(10) Patent No.: US 10,232,690 B1
(45) Date of Patent: Mar. 19, 2019

(54) SECURE COVER AND STORAGE SYSTEM FOR VEHICLES

(71) Applicant: Diabolical LLC, Herriman, UT (US)

(72) Inventor: Alan K. Huggett, Herriman, UT (US)

(73) Assignee: Diabolical LLC, Herriman, UT (US)

( * ) Notice: Subject to any disclaimer, the term of this patent is extended or adjusted under 35 U.S.C. 154(b) by 0 days.

(21) Appl. No.: 15/676,879

(22) Filed: Aug. 14, 2017

Related U.S. Application Data

(60) Provisional application No. 62/374,229, filed on Aug. 12, 2016.

(51) Int. Cl.
| | |
|---|---|
| *B60J 7/16* | (2006.01) |
| *B60J 7/19* | (2006.01) |
| *B60R 5/04* | (2006.01) |

(52) U.S. Cl.
CPC ............. *B60J 7/1621* (2013.01); *B60J 7/198* (2013.01); *B60R 5/04* (2013.01)

(58) Field of Classification Search
CPC ......... B60J 7/198; B60J 7/1621; B62D 65/00; B62D 33/03; B60R 5/04
USPC ............................................. 296/37.6, 100.07
See application file for complete search history.

(56) References Cited

U.S. PATENT DOCUMENTS

| | | | | |
|---|---|---|---|---|
| 4,580,827 A | * | 4/1986 | Feagan | B60R 11/06 224/404 |
| 4,938,519 A | * | 7/1990 | Schlachter | B60R 5/04 224/401 |
| 5,324,089 A | * | 6/1994 | Schlachter | B60R 5/04 292/DIG. 43 |
| 5,564,768 A | * | 10/1996 | Saffold | B60R 9/00 224/543 |
| 5,687,895 A | * | 11/1997 | Allison | B60R 7/02 220/23.4 |
| 6,065,794 A | * | 5/2000 | Schlachter | B60R 5/04 296/37.16 |
| 6,082,804 A | * | 7/2000 | Schlachter | B60R 9/00 224/281 |
| 6,092,708 A | * | 7/2000 | Rand | B60R 11/00 108/147.21 |

(Continued)

OTHER PUBLICATIONS

Aries Automotive "Jeep Security Cargo Lid," retrieved from http://www.ariesautomotive.com/part/2070465 Aug. 3, 2017 (4 pages).

(Continued)

*Primary Examiner* — Pinel E Romain
(74) *Attorney, Agent, or Firm* — Patent Law Works LLP

(57) ABSTRACT

An enclosure system for open-top vehicles is described. The enclosure system may include a top system coupleable with an open-top vehicle, the top system forming a top surface among a rear gate of the open-top vehicle, a first side of the open-top vehicle, a second side of the open-top vehicle, and a wall system, the top system, the wall system, the first side, the second side, and the rear gate of the open top-vehicle forming an enclosure. In some implementations, the top system may include top frame members, rigid surfaces, and a removable top panel. The wall system may be coupled with the top system and include a rigid wall extending between the top system and a floor of the open-top vehicle, the wall system separating the enclosure from a passenger area of the open-top vehicle.

17 Claims, 20 Drawing Sheets

(56) References Cited

U.S. PATENT DOCUMENTS

| | | | | |
|---|---|---|---|---|
| 6,113,179 | A * | 9/2000 | Szigeti | B60R 5/04 |
| | | | | 296/193.08 |
| 6,305,730 | B1 * | 10/2001 | Stone | B60R 9/00 |
| | | | | 296/37.16 |
| 6,447,051 | B1 * | 9/2002 | Lukomskiy | B60P 3/40 |
| | | | | 296/100.03 |
| 7,252,322 | B2 * | 8/2007 | Rusu | B60J 7/1621 |
| | | | | 296/100.07 |
| 7,438,338 | B1 * | 10/2008 | Schumacher | B60R 5/04 |
| | | | | 222/404 |
| 8,256,819 | B1 | 9/2012 | Gregory | |
| 8,517,445 | B1 | 8/2013 | Gregory | |
| D722,944 | S * | 2/2015 | Pifer, III | D12/401 |
| 9,039,062 | B1 | 5/2015 | Gregory | |
| 9,079,625 | B1 | 7/2015 | Gregory | |
| 9,845,060 | B2 * | 12/2017 | Howell | B62D 25/2072 |

OTHER PUBLICATIONS

Black Forest by Webasto "Cargo Surround and Security Storage System," retrieved from https://www.blackforestgear.com/cargo-surround-security-storage-system-5012270 Aug. 3, 2017 (1 page).

UK Unlimited Tailgate Enclosure, "Tuffy Security Products Serious Theft Protection," retrieved from https://www.tuffyproducts.com/p-495-tuffy-2011-jk-unlimited-security-tailgate-enclosure.aspx, Aug. 3, 2017 (3 pages).

Jeepbackbone.com, retrieved Aug. 10, 2017 (2 pages).

* cited by examiner

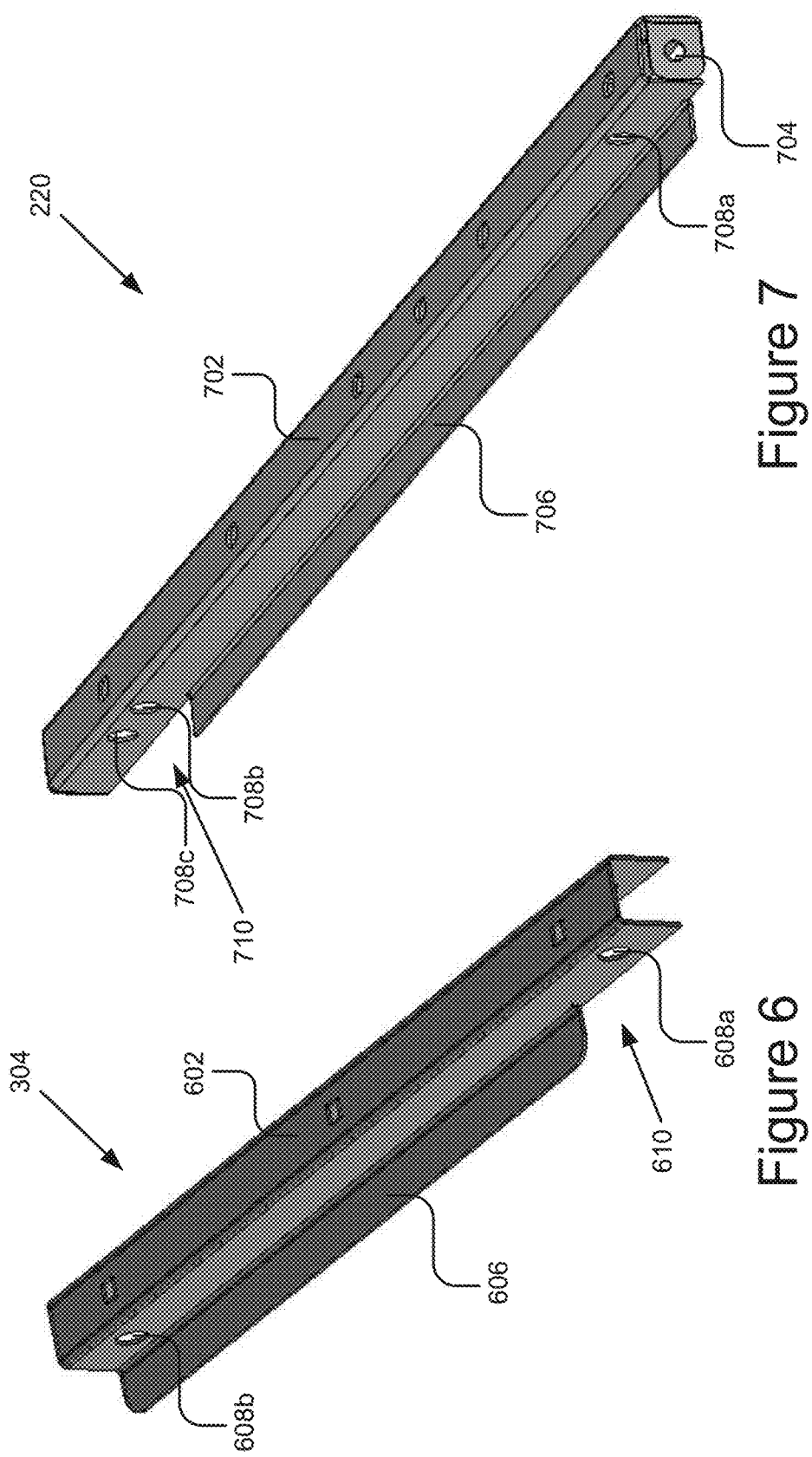

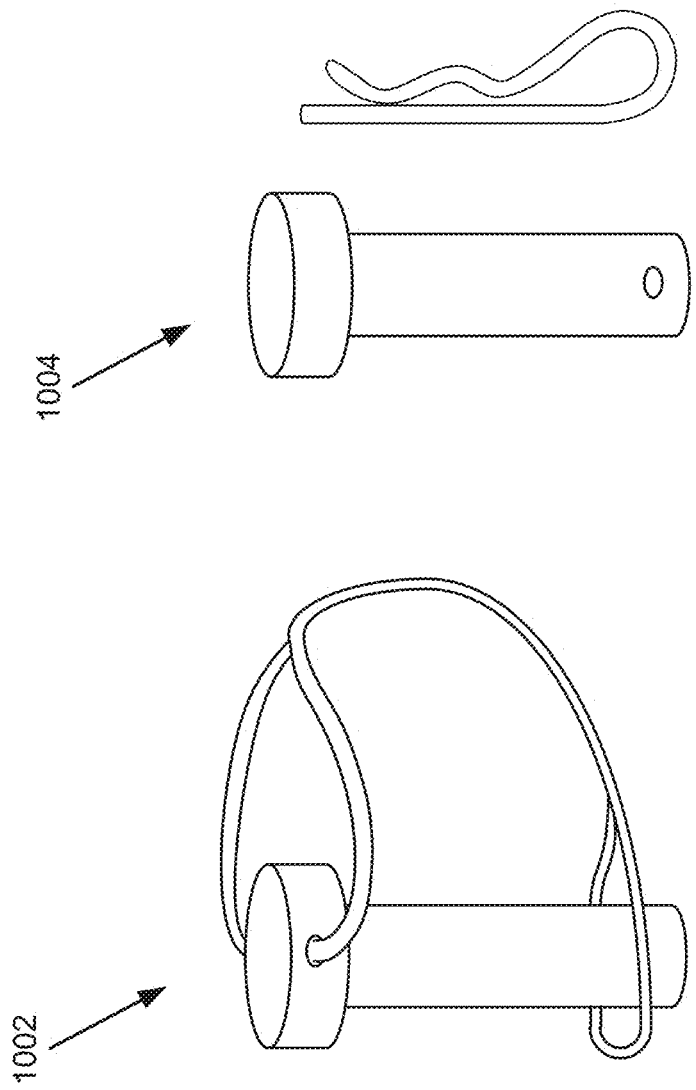

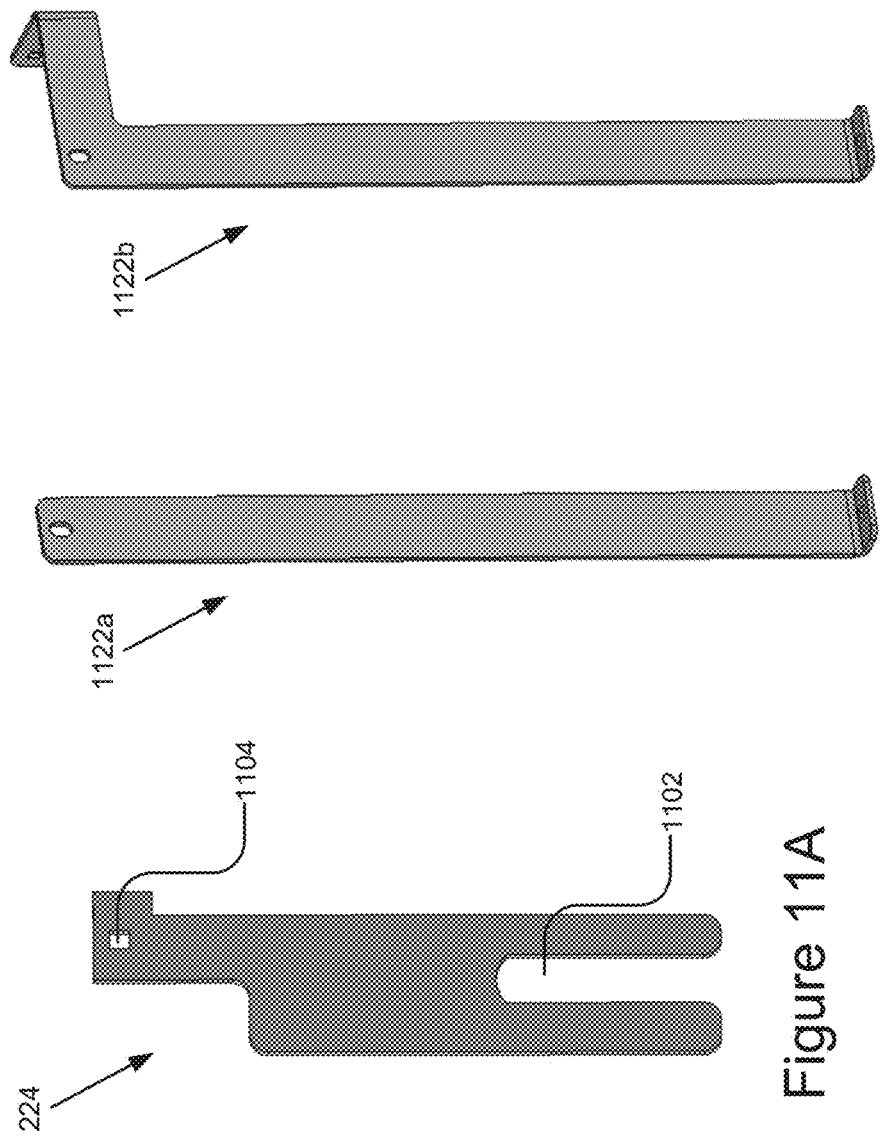

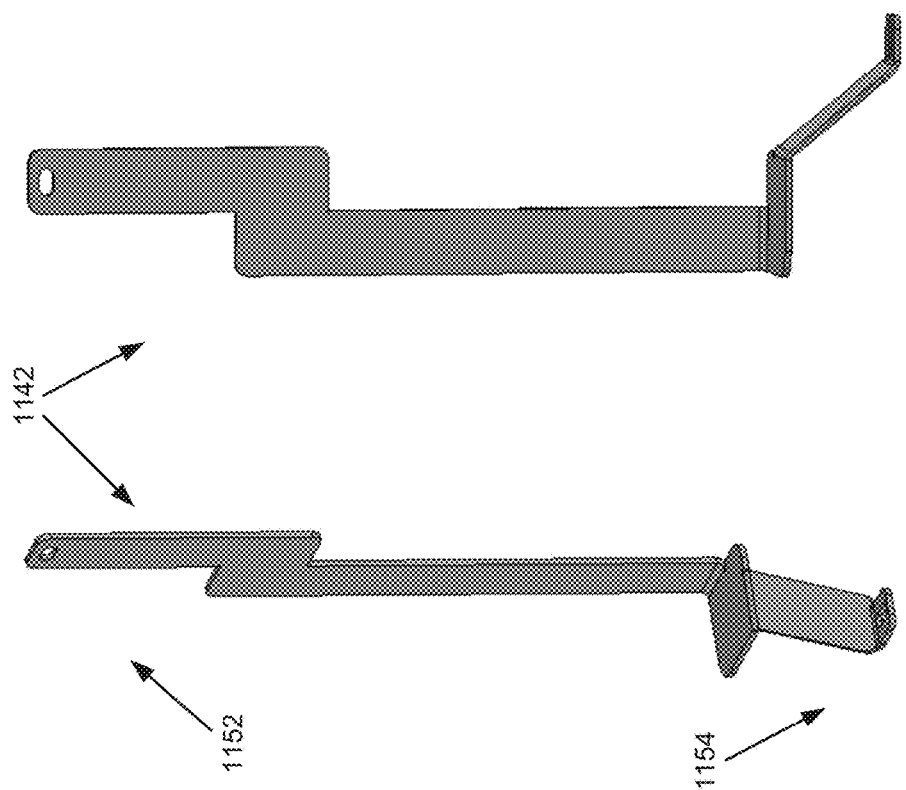

SECURE COVER AND STORAGE SYSTEM FOR VEHICLES

CROSS-REFERENCE TO RELATED APPLICATIONS

This application claims the benefit under 35 U.S.C. § 119(e) of U.S. Provisional Application No. 62/374,229, entitled "Secure Cover and Storage System for Vehicles," filed on Aug. 12, 2016, the entire contents of which are incorporated herein by reference.

BACKGROUND

The present disclosure relates to a secure modular enclosure for open-top vehicles.

Many automotive and outdoor enthusiasts enjoy vehicles with an open top or soft top, such as a Jeep Wrangler®, Hummer®, or another all-terrain vehicle. However, these vehicles do not provide secure storage, due to the openness of their storage areas. Past solutions for providing secure storage or weather protection include a hard shell covering the interior of the vehicle, but these solutions negate the advantages of an open-top vehicle.

Accordingly, it is desirable to provide an enclosure for the storage area of such open-top vehicles, while allowing the passenger compartment of the vehicle to remain open; however, the open nature of the storage areas of open-top vehicles presents unique challenges not in other storage enclosures or trunks of enclosed vehicles. Existing enclosures to the storage areas of open-top vehicles are inadequate as they are not secure, not adaptable to varying sized cargo, are not sufficiently strong to support items on top of the enclosure, and not adaptable to various vehicles. For example, some existing enclosures do not securely cover the entirety of the storage area, so that items within the enclosure can be accessed from the outside of the enclosure. Some existing enclosures for storage areas are merely constructed from panels that are not rigid enough to support items on top of the enclosure. Other existing enclosures do not allow tall or long items to be placed inside the enclosure or components of the enclosure to be swapped, folded, or removed to accommodate particularly large cargo. Further, some existing solutions attempt to provide additional structure, but these attempts further limit the space on the interior of the enclosure.

Accordingly, there is a need among enclosures for open-top vehicles to provide an enclosure system that is adaptable to fit different vehicle models and to accommodate various sized cargo, yet also secure from access from outside of the enclosure and strong enough to support heavy items on top of the enclosure.

SUMMARY

According to one innovative aspect of the subject matter described in this disclosure, an enclosure system for open-top vehicles. The enclosure system may include a top system coupleable with an open-top vehicle, the top system forming a top surface among a rear gate of the open-top vehicle, a first side of the open-top vehicle, a second side of the open-top vehicle, and a wall system, the top system, the wall system, the first side, the second side, and the rear gate of the open top-vehicle forming an enclosure, the top system including a first top frame member including an elongated body, the elongated body of the first top frame member having a vehicle mounting point adapted to couple the first top frame member to the open-top vehicle. The enclosure system also includes a first rigid surface coupled with the elongated body of the first top frame member and extending from the elongated body of the first top frame member to the first side of the open-top vehicle. The enclosure system also includes a second top frame member including an elongated body, the elongated body of the first top frame member having a vehicle mounting point adapted to couple the second top frame member with the open-top vehicle. The enclosure system also includes a second rigid surface coupled with the elongated body of the second top frame member and extending from the elongated body of the second top frame member to the second side of the open-top vehicle. The enclosure system also includes a removable top panel including a rectangular body extending between and supported by the elongated body of the first top frame member and the elongated body of the second top frame member, the removable top panel detachably coupled with the first top frame member and the second top frame member using a plurality of quick-release pins. The enclosure system also includes the wall system coupled with the top system, the wall system including a rigid wall extending between the top system and a floor of the open-top vehicle and a vehicle mounting point connected to the rigid wall, the wall system separating the enclosure from a passenger area of the open-top vehicle, the vehicle mounting point of the wall system adapted to couple the wall system with the open-top vehicle; a first wall frame member and a second wall frame member, the first wall frame member having an elongated body and a vehicle mounting point adapted to couple the first wall frame member with the open-top vehicle, the second wall frame member having an elongated body and a vehicle mounting point adapted to couple the second wall frame member with the open-top vehicle, the first wall frame member coupled with the first top frame member, and the second wall frame member coupled with the second top frame member; a removable wall panel having a rectangular body and an access panel, the access panel positioned within a passage through the removable wall panel, the access panel shaped to close the passage through the removable wall panel when the access panel is in a closed position, the access panel coupled to the removable wall panel by a hinge, the access panel having a locking mechanism for securing the access panel to the removable wall panel; a third rigid surface extending between a first side of the removable wall panel and the first side of the open-top vehicle; and a fourth rigid surface extending between a second side of the removable wall panel and the second side of the open-top vehicle.

In general, another innovative aspect of the subject matter described in this disclosure may be embodied in methods that include operations for the use and manufacture of the system above.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation, in the figures of the accompanying drawings in which like reference numerals are used to refer to similar elements.

FIG. 6 is a perspective view of an example wall frame member of the wall system of the enclosure system.

FIG. 7 is a perspective view of an example top frame member of a top system of the enclosure system.

FIGS. 10A and 10B are side views of example quick-release pins of the enclosure system.

FIGS. 11A-11C are views of example support brackets of the enclosure system.

FIGS. 11D and 11E are perspective views of an example multi-bend support bracket of the enclosure system.

DETAILED DESCRIPTION

Figure 1A:
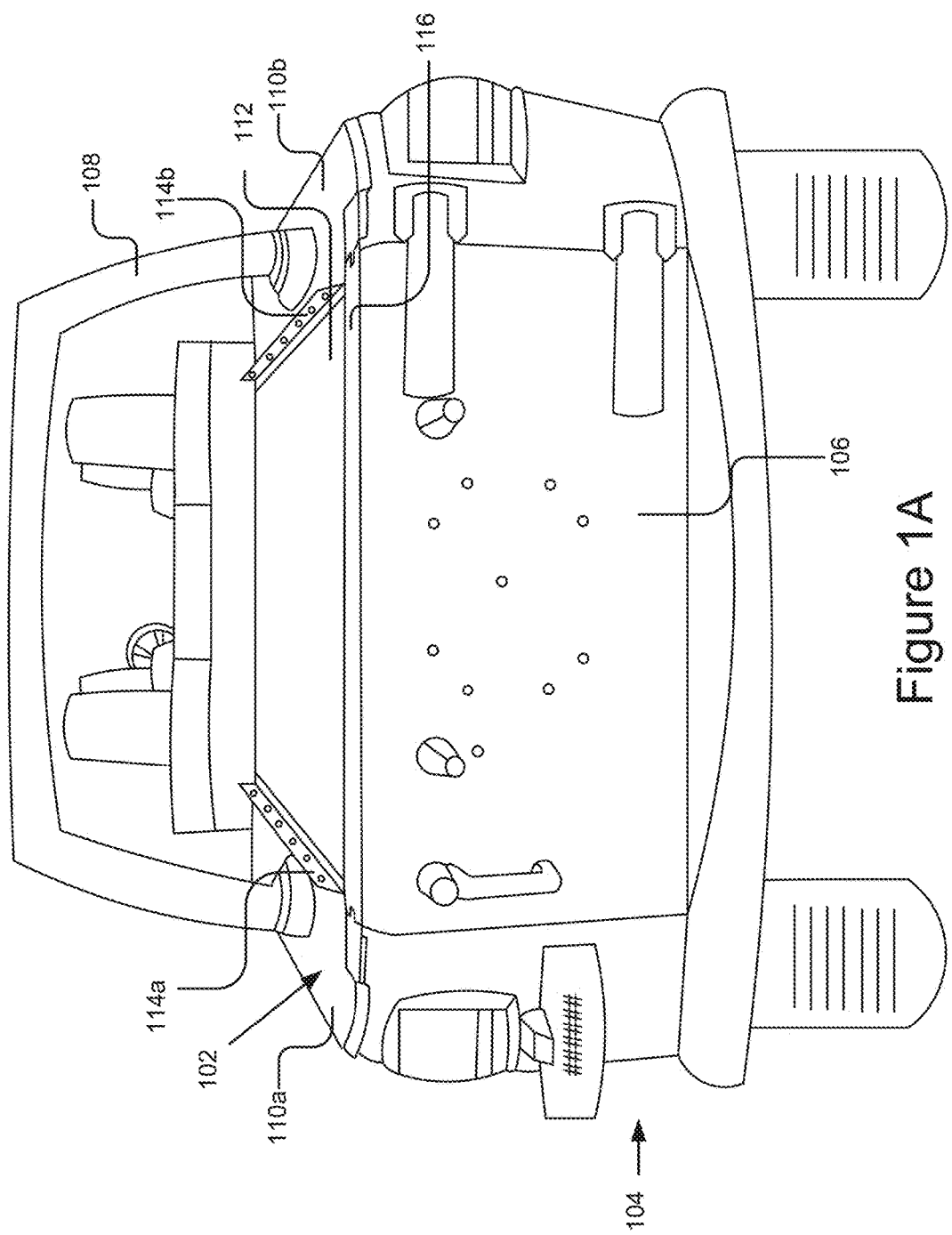
FIGS. 1A and 1B are back perspective views of an example enclosure system mounted to the storage area of an example open-top vehicle.

The secure cover and storage system or enclosure system 102 described herein is an alternative for a complete storage system using the existing body structure of a vehicle 104. For example, the enclosure system 102, in combination with the floor and walls of a vehicle 104 (e.g., an off-road vehicle 104, open-top or soft-top vehicle 104, etc., as described below), forms a strong structure with a secure interior cavity 120. The enclosure system 102 may be a fully modular system with an internal frame structure and removable top and wall panels. The frame structure and materials provide substantially more support than existing technology. Further, the enclosure system 102 may be configured for multiple uses and configurations which are multi-function, upgradable, modifiable, and/or designed to easily adapt to different uses and vehicles 104, unlike existing technology, which may be designed only to enclose a cavity.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

The enclosure system 102 described herein is a modular platform with a pivoting and/or replaceable top and wall panels to accommodate tall, large, long, or other cargo that may not typically fit in the a storage enclosure for open-top vehicles 104.

The enclosure system 102 has the ability to secure gear in the form of its own "trunk" (e.g., the enclosure or interior cavity 120 described herein) and may be configured with a removable top to allow the enclosure system 102 to store tall cargo. The vertical wall or wall system 204 may also be made for removal or include a removable panel and/or access panel, so that pass through (e.g., long or awkwardly shaped) cargo can be carried. For example, the wall system 204 or a portion thereof can fold down or be removed when the rear seats of the vehicle 104 are folded down. The wall system 204 may be configured similar to the removable top with pins or locks for removal or pivoting, as described in detail below.

The configuration of the enclosure system 102 described herein may also provide a modular platform where skins (e.g., as described in reference to FIG. 8A-8C) can be replaced or adjusted to accommodate different sizes or shapes of vehicles 104. The top panel 112 can be removed or tilted to provide access to the interior cavity 120 and/or for storage for tall cargo, or the top panel 112 can be replaced with top panels of different sizes to increase the interior volume of the interior cavity 120. A wall panel 228 can be removed or folded down accommodate long cargo. A locking access panel 508 may be included in the wall panel to provide access from the front of the enclosure system 102 or the passenger compartment of the vehicle 104. The engineering of the frame system 302, associated support brackets, and interaction of the frame system 302 with the other components of the enclosure system 102 provides a modular platform with these benefits while the system retains substantial strength to allow the top surface thereof to be load bearing.

The enclosure system 102 described herein is substantially stronger than existing technology due its use of materials, such as steel, aluminum, plastics, or other strong materials, and a frame with brackets that use the factory mounts and bolt locations on vehicles 104. When the pieces of the frame, walls, and skins are connected, the strength is in the collective design of the components. For example, some current technology may only support around 75 pounds, while the enclosure system 102, according to various implementations, as described herein can support over 200 to 400 pounds (e.g., of objects mounted to the top of the secure cover and storage system).

As discussed in more detail below in reference to FIG. 1B, some implementations of the enclosure system 102 further provide the benefit of securing a storage area of the vehicle (e.g., an open-top vehicle 104, as described below). Some security features of the enclosure system 102 include that the interior cavity 120 or enclosure may not be accessible other than through the rear gate 106 (or access panel of the wall system 204, depending on the implementation) of the vehicle 104 and removable panels of the enclosure system 102 may not be removed until access through the rear gate 106 is obtained. This may be accomplished using the components of the enclosure system 102 as well as the use of carriage bolts and/or quick-release pins, as described below.

Figure 1B:
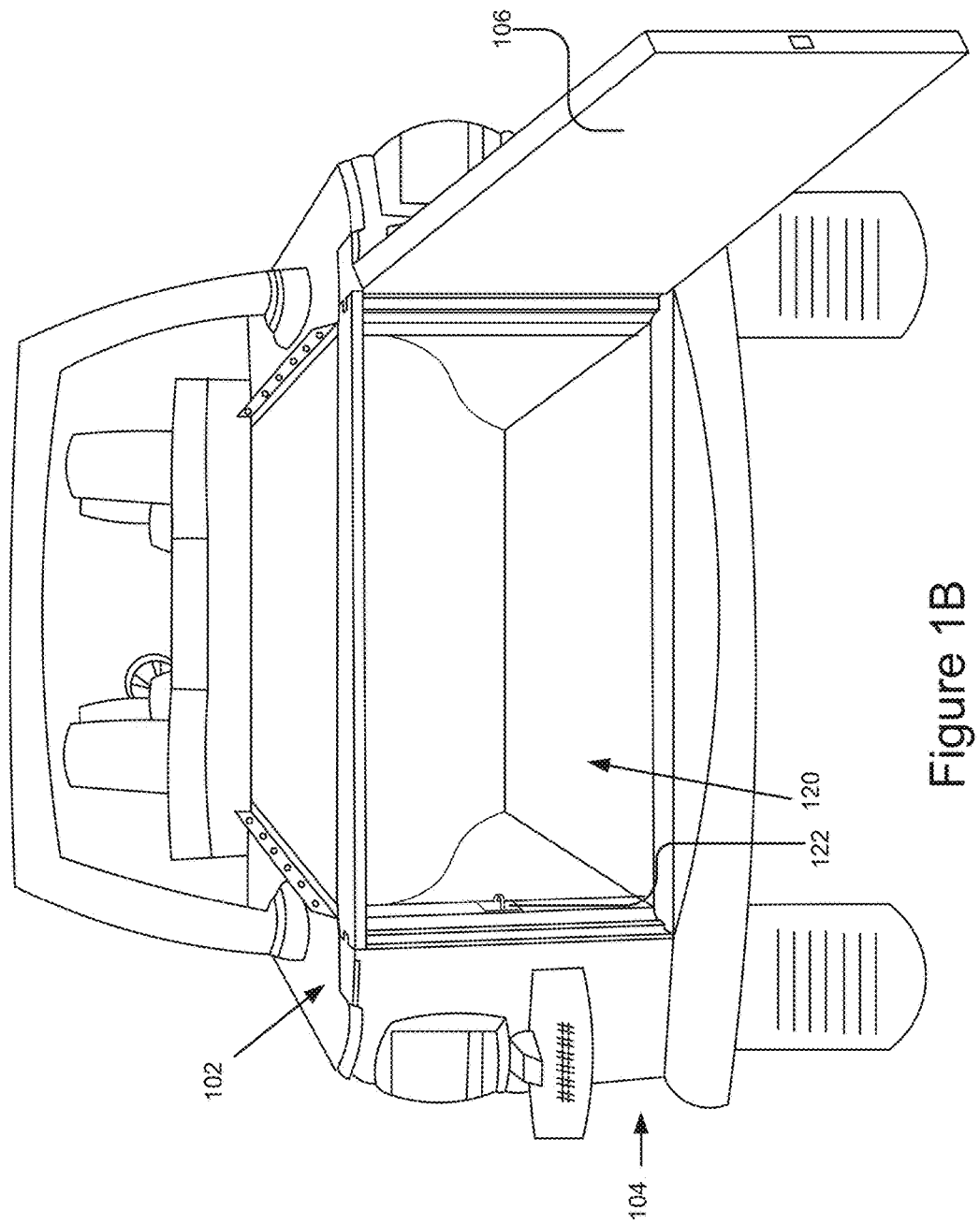
Figure 8A:
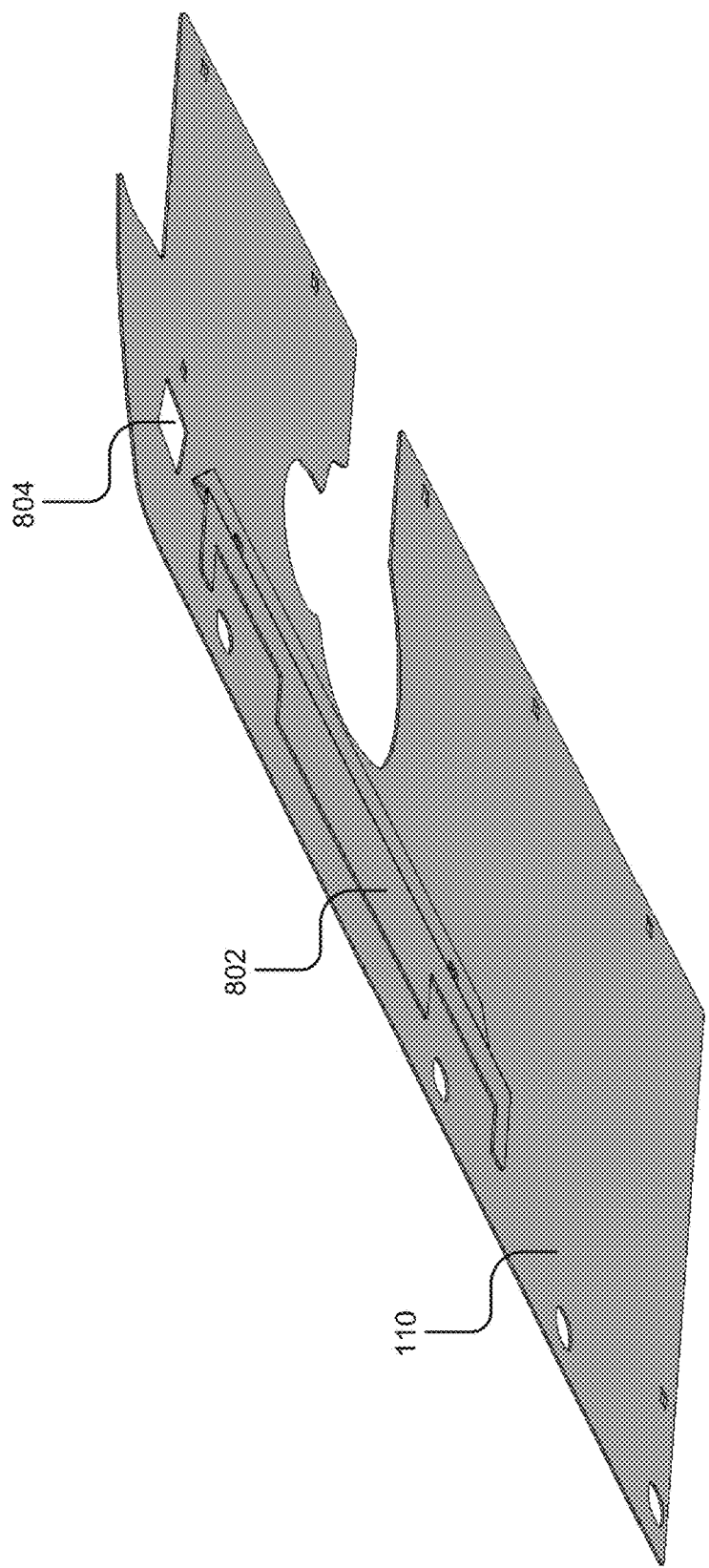
FIG. 8A is bottom-up perspective view of an example top side skin and security plate of the enclosure system.

Another security feature according to some implementations of the enclosure system 102 are skins (e.g., as described in FIG. 8A-8C) that extend to, match the contours of, and, in some instances (e.g., as described in the example security plate described in FIG. 8A), secure to the sides, gate, or roll bars 108, etc., of the vehicle 104 (e.g., of a top edge of a storage area of the vehicle 104, as illustrated in FIGS. 1A and 1B).

FIG. 1A is a back perspective view of an example enclosure system 102 installed on a storage area of an example open-top vehicle 104. As illustrated, the vehicle's storage area may be open, so that the enclosure system 102 may cover or enclose the storage area in order to secure cargo items in an interior cavity 120 formed by the enclosure system 102 and the vehicle 104, thereby protecting the cargo from theft, or weather.

Some examples of open-top vehicles 104 that may claim particular benefit of the enclosure system 102 include Jeep Wranglers® such as, the following models: CJ, YJ, TJ, LJ, JK, JKU, and JL; Hummer®; side-by-side or other all-terrain vehicles 104; etc. It should be noted that these vehicles 104 are provided by way of example and other vehicles 104 are possible and contemplated. The enclosure system 102 may be configured to be easily modified to match changes to future vehicle 104 models (e.g., changes in length, height, roll bar location, mount options, etc.). These and other implementations are described in further detail in reference to the Figures below.

The enclosure system 102 may be configured to be used on a vehicle 104 with an attachable hard top/roof or soft top/roof (not shown) while the attachable top/roof is attached to the vehicle 104. Similarly, it should be noted that, in some implementations, the enclosure system 102 may be used with a hard top that is permanently integrated with the vehicle 104.

As illustrated in FIG. 1A, the enclosure system 102 may include a removable top panel 112 and one or more skins 110 and 116 that form a top surface among a rear gate 106 of the vehicle 104, a left side of the vehicle 104, a right side of the vehicle 104 and a wall system 204 separating the storage area of the vehicle 104 from the passenger area of the vehicle 104. In some implementations, the skins may be attached to frame members (not shown in FIG. 1A) to cover the top edges of the sides of the vehicle 104. The skins may have one or more cutouts for roll bars 108, wires, or other items to pass through while the enclosure system 102 covers the entire rear storage compartment of the vehicle 104 for weather protection and to prevent entry from the outside of the enclosure (e.g., as by theft of cargo items).

In some implementations, skins of the enclosure system 102 may follow the contour of the vehicle body and may be configured to remain in place with a vehicle hardtop or soft top in place or removed. Thus, once the enclosure system 102 is installed, it may not have to be removed. In some implementations, a user may merely install and/or remove the vehicle's hardtop without interference by the enclosure system 102.

Figure 3A:
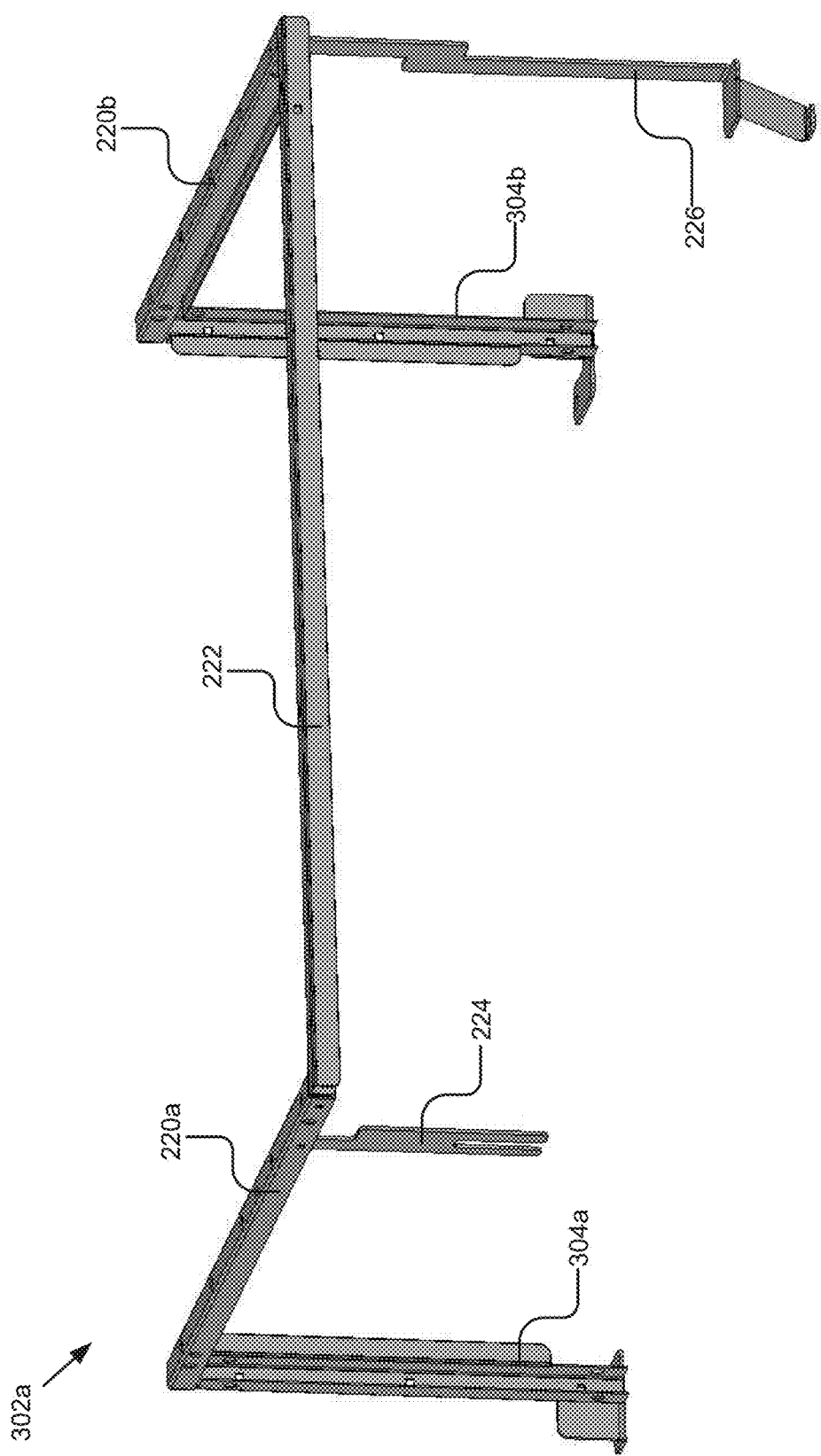
FIGS. 3A and 3B are back perspective views of example frame and mounting components of the enclosure system.
Figure 3B:
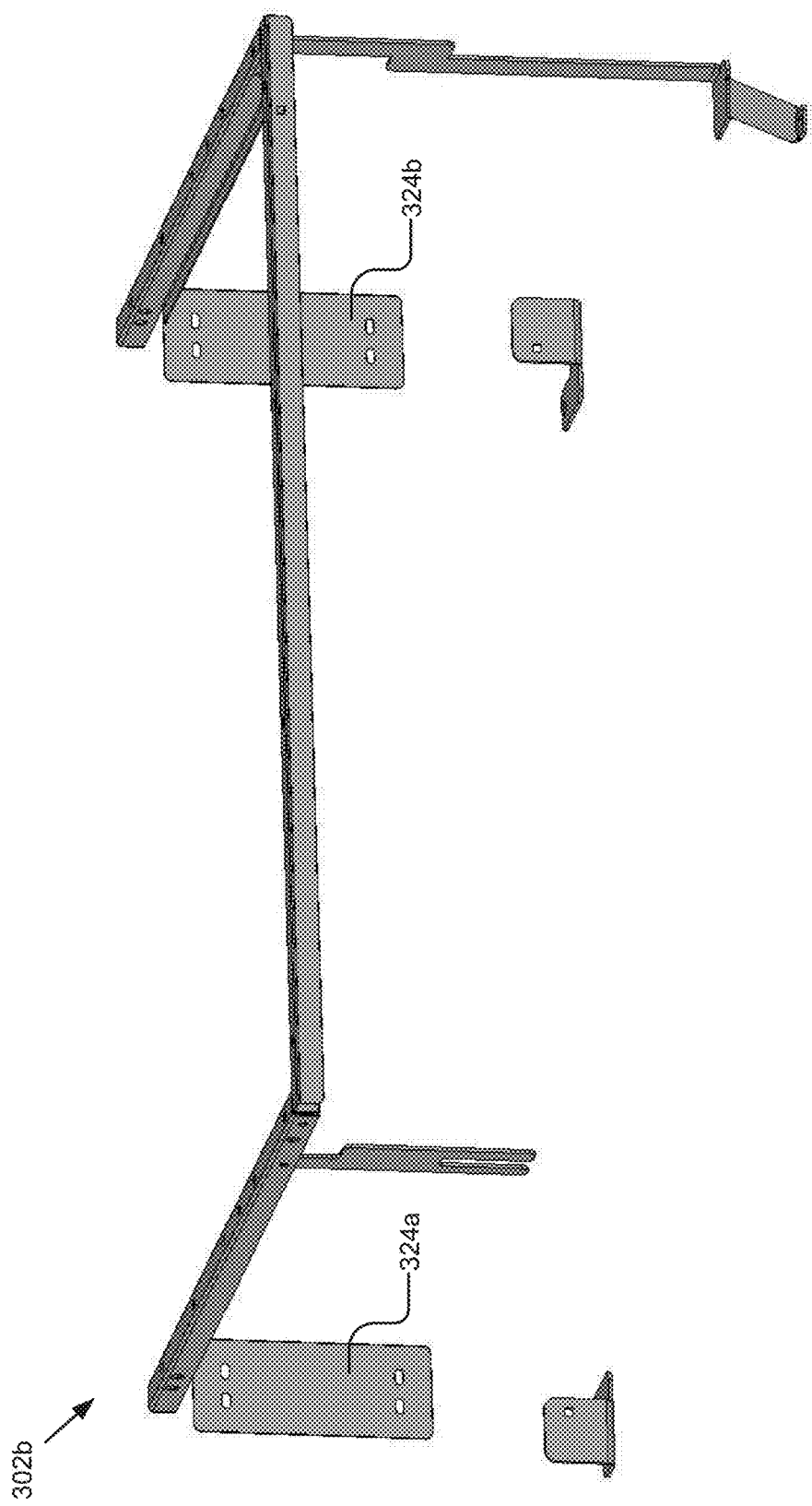

The skins of the secure cover and storage system fit securely onto the frame members (discussed in further detail below) and have a very small gap (e.g., in the range of 1/16-1/2 inch, 1/8 inch, less than 1 inch, etc.) around the roll bars 108, etc. The skins may be configured to fit any of the different roll bar locations associated with the year and model of the vehicle 104 (e.g., models of the Jeep Wrangler®). For example, different side skins may be used to accommodate the sizes of sides, wiring, roll bars 108, etc., of different model years of the vehicle 104. Accordingly, in some implementations, once the enclosure system 102 is installed, the only access on the interior cavity 120 may be through the tailgate using the vehicle's factory locking capabilities. In some implementations, the enclosure system 102 is configured to allow use of individual locks that utilize the frame structure of the enclosure system 102 (e.g., as shown in FIGS. 3A and 3B) for the locks to secure the interior cavity 120 formed by the vehicle 104 and the enclosure system 102.

The combined strength of the components of the enclosure system 102 allows the enclosure system 102 to support substantial weight on the top. This strength may be derived from the combination of its components and integration with mounting points of the vehicle 104. The enclosure system 102 may be configured to securely support objects on its top and/or side skins, for example, using tie down brackets 114.

In some implementations, the enclosure system 102 may include tie down brackets 114a and 114b. The tie down brackets 114 may be used to tie objects to the top of the enclosure system 102. In some implementations, the tie down brackets 114 may be securely attached to top frame members 220, described elsewhere herein (e.g., in reference to FIGS. 3 and 7), to provide additional strength to the assembly and to allow objects to be tied to the top of the enclosure system 102. In some implementations, the tie down brackets 114 may be attached to the removable top, so the top may be opened without removing the attached objects. In some implementations, the tie down brackets 114 may be attached to the side skins and/or top frame members 220 to allow the tie down brackets 114 to be used even when the removable top is removed or in an open position.

In some implementations, the enclosure system 102 may be configured to incorporate accessories, such as Molle panels to hold gear, different sizes of top panels or skins, or other accessories. For example, the removable top panel 112 may include an accessory rubber pad (not shown) mounted thereto upon which objects may be placed to prevent items from sliding across the removable top. The rubber pad may be attached using straps, friction, adhesive, magnets, or other attachment means.

FIG. 1B is a back perspective view of an example enclosure system 102 mounted to the storage area of an example open-top vehicle 104 with a rear gate 106 of the vehicle 104 in an open position. As illustrated, the enclosure system 102 in combination with the storage area of the vehicle 104 form an enclosure or interior cavity 120. The interior cavity 120 may be accessed by opening the rear gate 106 of the vehicle 104. The vehicle 104 may also include a latch striker plate 122 for securing the rear gate 106 closed.

In some implementations, the enclosure system 102 secures the storage area of the vehicle 104 so that the interior cavity 120 or enclosure may be accessible through the rear gate 106 (or access panel of the wall system 204, depending on the implementation) of the vehicle 104 and removable panels of the enclosure system 102 are not removable until access through the rear gate 106 is obtained (unless a removable top panel 112, wall panel 228, or access panel 508 is opened or removed). For example, components of the enclosure system 102 may be assembled using bolts and/or quick-release pins that are accessible only from the interior cavity 120 of the enclosure system 102. Fasteners that are used to assemble the enclosure system 102 may be configured such that the enclosure system 102 cannot be opened from the outside the interior cavity 120 while the system is assembled and attached to a vehicle 104. For instance, the skins (e.g., as described in FIGS. 8A-8C) may be bolted to frame member(s) of the enclosure system 102 using carriage bolts where the nut of the carriage bolt faces inward toward the interior cavity 120 so that the bolts can only be tightened or loosened from inside the interior cavity 120 in order to prevent disassembly and/or unauthorized access to the interior cavity 120. Similarly, in some implementations, the removable top panel 112 (e.g., described in reference to FIG. 4) and/or removable wall panel 228 (e.g., described in FIGS. 5A-5C) may be secured to the enclosure system 102 (e.g., via frame members) using quick-release pins (e.g., as described in reference to FIGS. 10A and 10B) that are accessible only from the interior cavity 120.

It should be noted that while the components of the enclosure system 102 may be assembled using methods that allow components to be easily attached and detached, such as quick-release pins, other fasteners or fastening methods are possible and contemplated herein. Although quick-release pins and carriage bolts are described herein, other fasteners or fastening methods (e.g., welding, integral forming of components of the secure cover and storage system 102, etc.) are possible and contemplated.

Figure 2A:
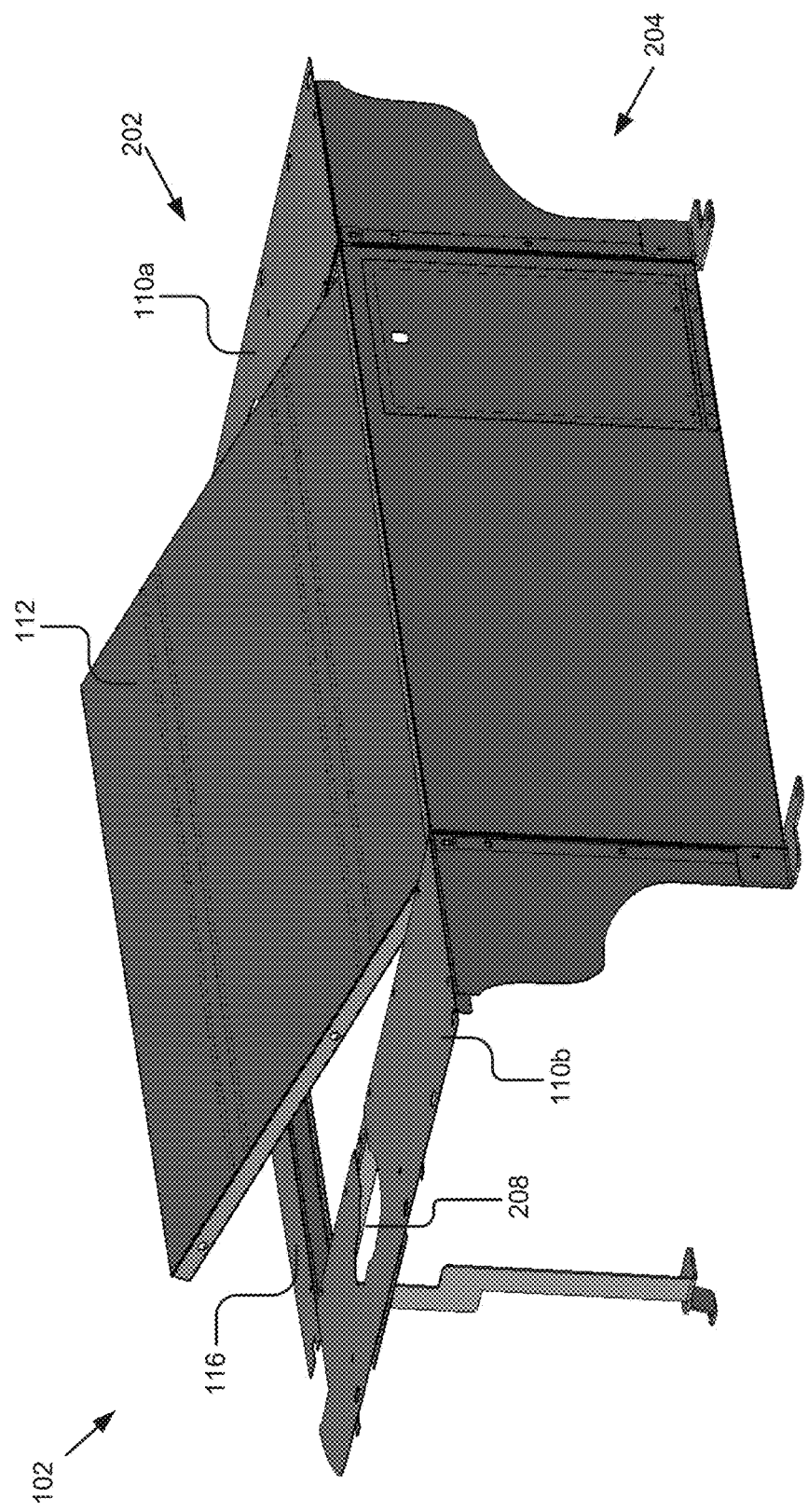
FIG. 2A is a front perspective view of an example enclosure system for open-top vehicles.

FIG. 2A is a front perspective view of an example enclosure system 102. The enclosure system 102 may include a top system 202 that is coupleable with the vehicle 104, for example, using one or more mounting points and/or brackets. The top system 202 may form a top surface among a rear gate 106 of the vehicle 104, a first side of the vehicle 104, a second side of the vehicle 104, and a wall system 204. The top system 202, the wall system 204, and the sides, floor, and rear gate 106 of the vehicle 104 form an enclosure, as illustrated in FIGS. 1A and 1B.

The wall system 204 may be coupled with the top system 202 and may include a rigid wall extending between the top system 202 and a floor of the vehicle 104. The wall system 204 separates the interior cavity 120 from the passenger compartment, for example, the wall system 204 form a partition between the interior cavity 120 and the back seats of the vehicle 104 to separate the enclosure from the passenger area of the vehicle 104. The wall system 204 may be attachable to the vehicle 104. In some implementations, the wall system 204 is attachable at a vehicle 104 mounting point of the wall system 204 to factory bolts, brackets, or other features of the vehicle 104. For example, the wall system 204 may be attachable to a seat mount (not shown) of the vehicle 104 using a floor bracket 504. The floor bracket 504 may attach the wall system 204 (e.g., the wall frame members 304, the patch panels 324, the wall side skins 502, etc.) to the floor, a factory mount point, and/or factory seat mount of the vehicle 104.

It should be noted that although the wall system 204 may be described herein as being vertical, it may be configured to be at any angle relative to the vehicle 104 and/or enclosure system 102. Example implementations of the wall system 204 are described in reference to FIGS. 5A-5C.

As illustrated, the top system 202 may include a removable top panel 112, one or more top side skins 110a and 110b, and a top rear skin 116. The top side skins 110 may be shaped to fit the interior and/or exterior contours of the vehicle 104 including any gates, roll bars 108, or other features of the vehicle 104. For example, as depicted in FIG. 9A, the top side skins 110 may include one or more cutouts 208 matching the shape and dimensions of a roll bar 108.

Figure 2B:
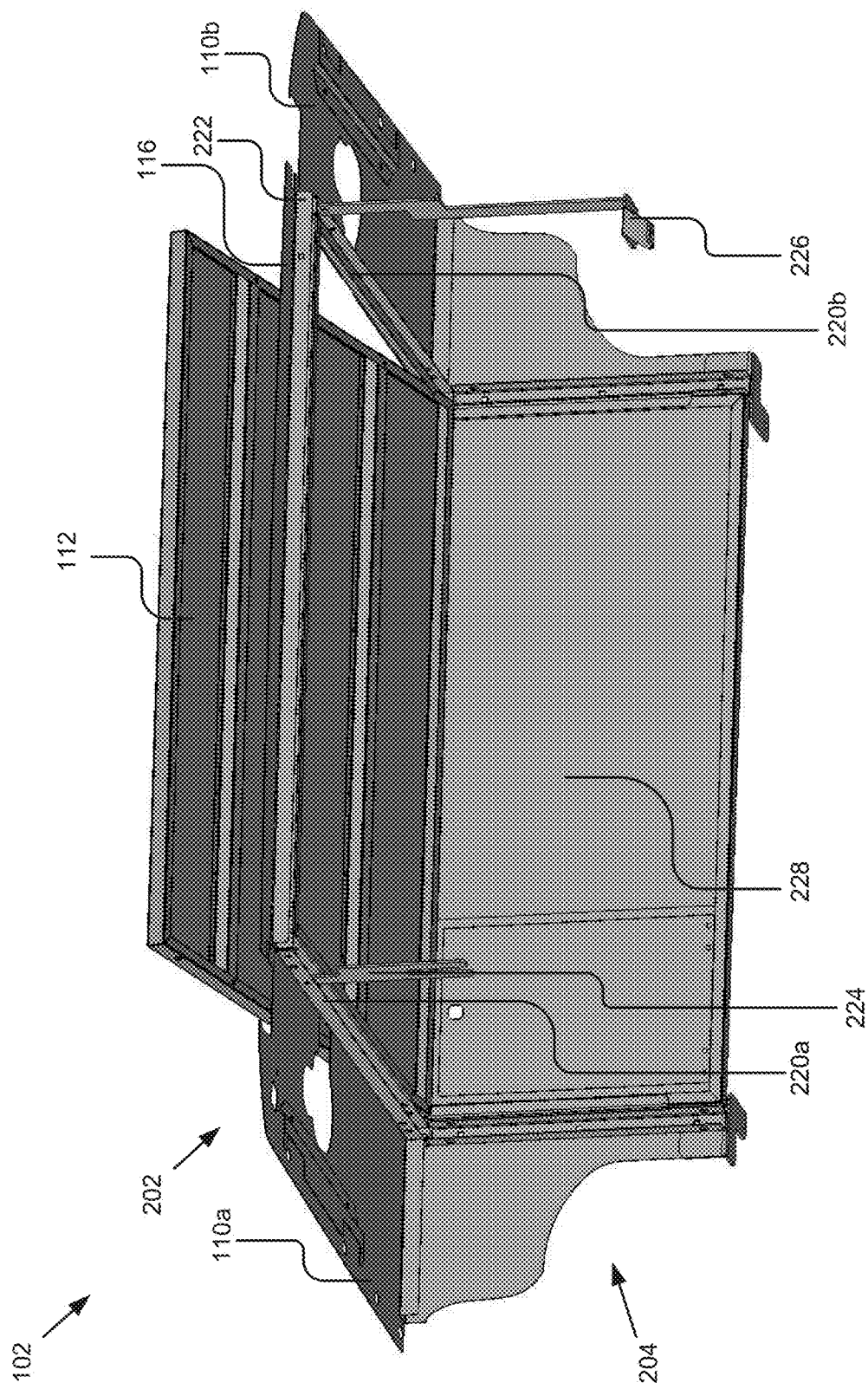
FIG. 2B is a back perspective view of an example enclosure system for open-top vehicles.

FIG. 2B is a back perspective view of an example enclosure system 102 with a top system 202 and a wall system 204.

As illustrated in FIG. 2B, the top system 202 may include a first and second top frame member 220a and 220b, a first and second top side skin 110a and 110b, and a removable top panel 112. In some implementations, as illustrated, the top system 202 may also include a rear frame member 222, and a top rear skin 116.

The first and second top frame members 220a and 220b may include elongated bodies with mounting points adapted to couple the top frame members 220 to the open-top vehicle 104. Depending on the implementation, the top frame members 220 may be coupleable either directly or indirectly with the vehicle 104. For example, as illustrated the first or left top frame member 220a may be coupled with the vehicle 104 by a first support bracket 224 (e.g., as shown an described in further detail in reference to FIG. 11A) attached to the mounting point of the first frame member and latch striker plate 122 of the vehicle 104. The second or right top frame member 220b may be coupled with the vehicle 104 by a second support bracket 226 (e.g., as shown and described in reference to FIGS. 11B-11E) attachable to a factory bolt of the vehicle 104. It should be noted that other brackets and positions are possible and contemplated herein.

The top side skins 110 may include a rigid surface coupled with the elongated body of the top frame members 220 and extending from the top frame members 220 substantially horizontally to the side of the open-top vehicle 104, as shown in FIGS. 1A and 1B. The example top side skins 110 may be attached to the top frame members 220, for example, using carriage bolts, although other attachment means such as welding, adhesive, etc., are possible. The top side skins 110 may enclose the storage area/trunk of the vehicle 104 for theft and/or weather protection.

The removable top panel 112 is shown in FIG. 2B in an open, but attached, position. The removable top panel 112 may attach to and be supported by the top frame members 220, for example, via one or more quick-release pins (not shown in FIG. 2B). For example, the removable top panel 112 may pivot about an axis defined by two quick-release pins (although other hinges, pins, or attachment means are possible) passing through at least a portion of each of the first and second top frame members 220a and 220b and an edge of the removable top panel 112. For example, the removable pins allow the removable top panel 112 to pivot, to be removed, or to be replaced or modified. Accordingly, a user may easily and quickly open or remove the removable top panel 112 to add items to the interior cavity 120 of the enclosure system 102 or to accommodate transportation or storage of tall items.

As illustrated, the removable top panel 112 and top frame members 220 may be configured with edges or perforations pointing inward toward the interior cavity 120, so that the quick-release pins are accessible/removable only from the interior cavity 120 (e.g., through a rear gate 106 of the vehicle 104) when the enclosure system 102 is installed on the vehicle 104. Accordingly, because the removable clips may be located under the top surface of the enclosure system 102, the removable top panel 112 cannot be opened from outside of the interior cavity 120. Thus, the enclosure system 102 securely prevents the removable top panel 112 from being opened while the rear gate 106 of the vehicle 104 is closed.

In some implementations, the wall system 204 may also include a removable wall panel 228 that may be removed from the enclosure system 102. For example, in some implementations, the removable wall panel 228 may be attached using quick-release pins, latches, or other means which allow the removable wall panel 228 to pivot or be removed. Removal or pivoting of the removable wall panel 228 may allow long or unusually shaped items to be stored in the interior cavity 120 formed by the enclosure system 102 and the vehicle 104 (e.g., trunk, floor, walls, etc.) without removing the enclosure system 102.

Figure 2C:
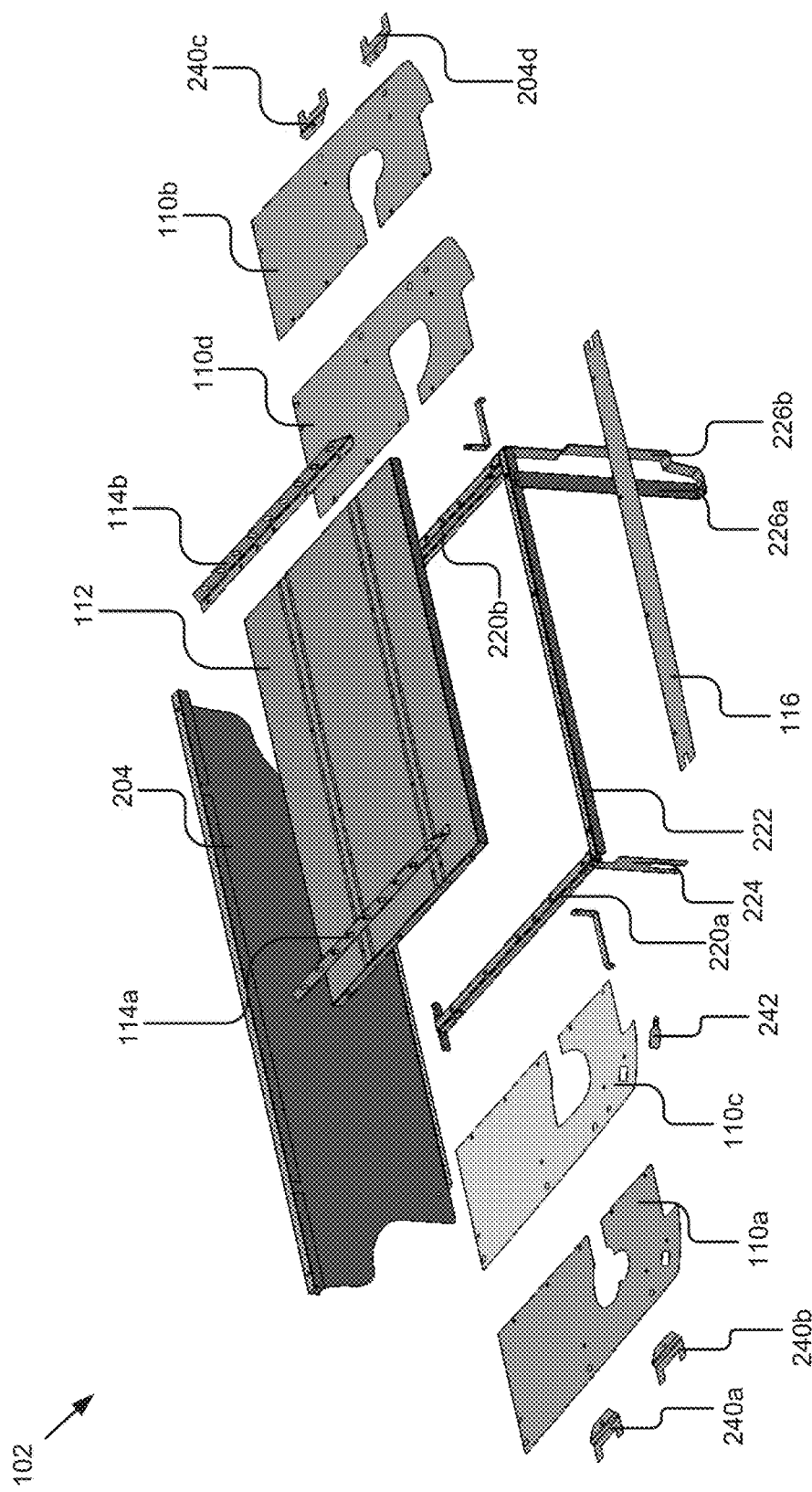
FIG. 2C is an exploded view of example components of the enclosure system.

FIG. 2C is an exploded view of example components of some implementations of the enclosure system 102. In some implementations, the enclosure system 102 may include one or more of: a wall system 204, a removable top panel 112, tie down brackets 114, top frame members 220, top side skins 110a, 110b, 110c, and 110d, a rear frame member 222, a top rear skin 116, support brackets 224, 226a, and 226b, security plates 240a, 240b, 240c, and 240d, and a wiring closeout cover 242, although additional or fewer components are possible. As illustrated, various configurations of top side skins 110 are possible and contemplated in order to match various vehicles 104. In some implementations, a wiring closeout cover 242 may be coupled with a top side skin 110 to cover a wiring hole in the top side skin 110. Each top side skin 110 may have attached or attachable one or more security plates 240a-240d (also referred to as fork plates) to secure the top side skin 110 to a side of the vehicle 104. As illustrated in FIG. 2C, each top side skin 110 may have two security plates 240, although other implementations are possible, for example, as illustrated in FIG. 8A, each top side skin 110 may have a single security plate 802. A security plate 240 or 802 is described in further detail in reference to FIG. 8A. It should be noted that additional, fewer, or different components may be included in the enclosure system 102 without departing from the scope of this disclosure. Further, in some implementations, components be integrated or further divided, for example, the top rear frame member 222 and/or the top rear skin 116 may be integrated into the removable top panel 112. It should be understood that the components of the enclosure system 102 may be sized or modified to fit various vehicles 104 (e.g., makes, models, years, body styles, etc.) without departing from the scope of this disclosure.

Further, the enclosure system 102 is configured to be modular, while retaining substantial structural integrity. Thus, the removable top panel 112, skins, removable wall panel 228, etc., of the enclosure system 102 may be removable or modifyable to accommodate various operations (e.g., loading different sized cargo). Simultaneously, the modular components of the enclosure system 102 may be easily reassembled once the user is done with these operations.

FIGS. 3A and 3B are back perspective views of example frame and mounting components of the enclosure system 102. As illustrated, the enclosure system 102 may include an independent frame system 302a, whose strength may be further augmented by the skins, brackets, and/or removable panels described herein. The frame system 302 (e.g., implementations of the frame system 302a and/or 302b illustrated in FIGS. 3A and 3B) may be attachable with the vehicle 104 using factory bolt points of the vehicle 104 to add strength, for example, brackets of the frame system 302 may mount to seat mounting points, rear gate 106 hinge bolts, a latch striker plate 122, or other factory bolts or factory mount points of the vehicle 104, although other implementations are possible. In some implementations, the frame system 302 is a standalone system that may allow for quick removal of panels (e.g., the removable top panel 112 or removable wall panel 228) or bolt in panels (e.g., the skins described herein). Once the frame system 302 is installed on the vehicle 104, the frame system 302 may not need to be removed to adjust, open, or modify the enclosure system 102. The configuration of the frame system 302 may also allow the enclosure system 102 to remain in place even when a soft or hard top/roof is mounted to an open-top vehicle 104.

In particular, FIG. 3A illustrates several components assembled in a frame system 302a, for example, in a configuration as if installed on a vehicle 104. As illustrated in FIG. 3A, the enclosure system 102 may include top frame members 220a and 220b, wall frame members 304a and 304b, a rear frame member 222, and brackets, although other additional or fewer components may be used. For example, the rear frame member 222 may be omitted or integrated into the removable top panel 112 (not shown in FIG. 3A).

The top frame members 220 and/or wall frame members 304 may attach to the vehicle 104 either directly or indirectly, and provide support for other components of the enclosure system 102. In some implementations, the top frame members 220 may attach to the wall frame members 304, as shown in FIG. 3A, or the top frame members 220 may otherwise attach to the vehicle 104 or the wall system 204. In some implementations, the top frame members 220 may attach to the vehicle 104 via the support brackets 224 and/or 226.

FIG. 3b is a back perspective view of example frame and mounting components of the enclosure system 102. As illustrated, the enclosure system 102 may include an independent frame system 302b, whose strength may be further augmented by the skins, brackets, and/or removable panels described herein. The implementation of the frame system 302b depicted in FIG. 3B omits the wall frame members 304 of the implementation of the frame system 302a of FIG. 3B and includes patch panels 324a and 324b. The patch panels 324 may attach the wall side skins 502 to a wall panel 228. In some implementations, the patch panels 324, in combination with the wall side skins 502 and the wall panel 228 may be combined to form the wall system 204, although other implementations are possible and contemplated in the techniques described herein.

Figure 4:
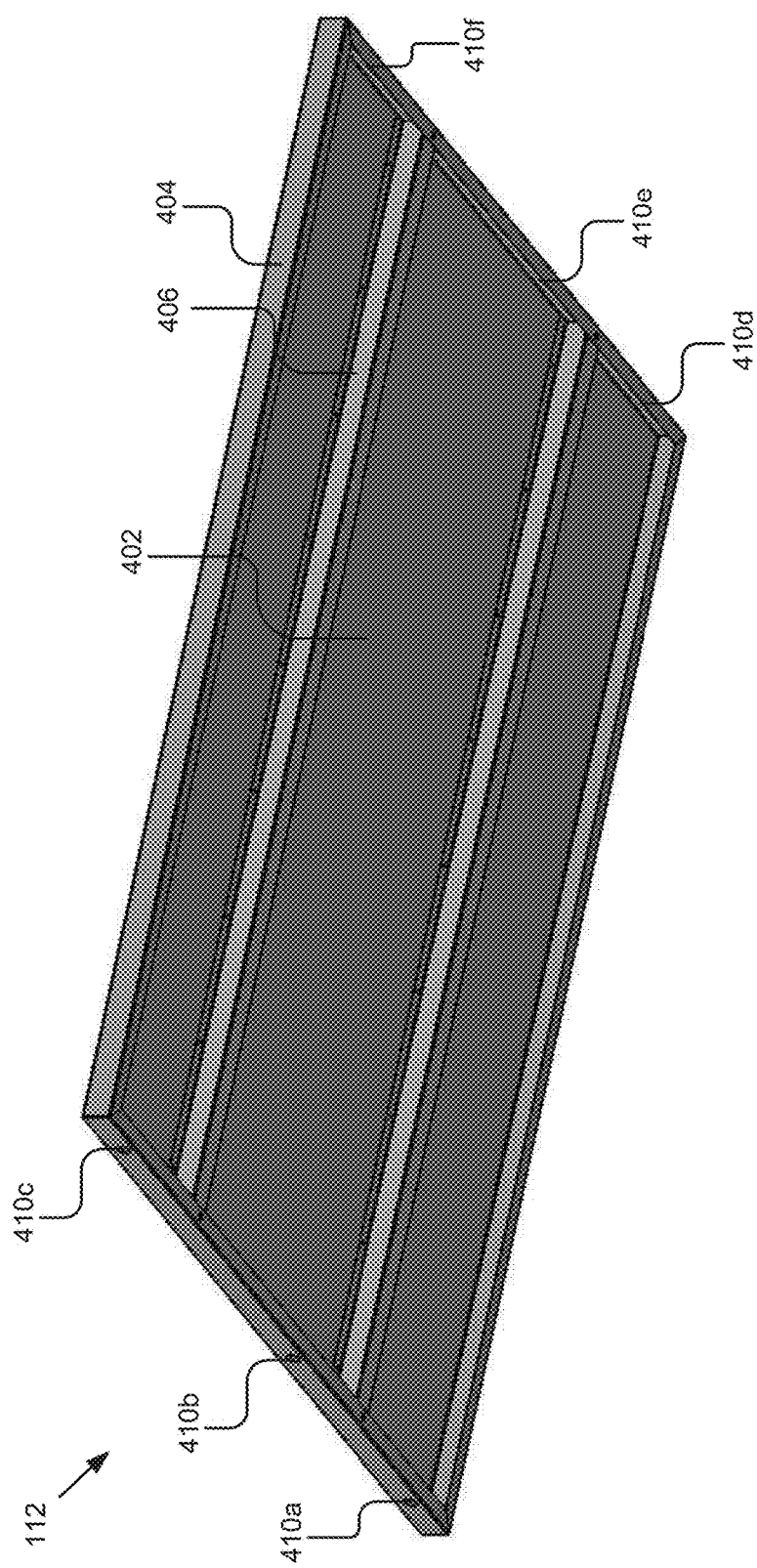
FIG. 4 is a bottom-up perspective view of an example removable top of the enclosure system.

FIG. 4 is a bottom-up perspective view of an example removable top panel 112 of the enclosure system 102 in a detached position. The removable top panel 112 may include a rectangular body 402 extending between and supported by the elongated body of the first top frame member 220a and the elongated body of the second top frame member 220b. As discussed above, the removable top panel 112 may be detachably coupled with the first top frame member 220a and the second top frame member 220b using a plurality of quick-release pins.

In some implementations, the removable top panel 112 includes a metal plate and support structure coupled with the metal plate. Other materials and constructions are possible, for example, the plate may be constructed from plastic, carbon fiber, fiberglass, or other suitable materials.

In some implementations, the support structure may include that the removable top panel 112 may have a channel 404 attached to or formed along its perimeter edge. For example, the metal plate may define a perimeter edge and the plate is folded along the perimeter edge to provide support. For example, a first fold may include 1 inch of the metal plate and a second fold may include a half inch of the metal plate thereby creating side channels to add strength to the removable top panel 112. Further, in some implementations, the support structure of the removable top panel 112 may include one, two, three, or more hat channels 406 welded to a bottom surface of the metal plate to provide support across the removable top panel 112. The hat channels 406 may be the same thickness (e.g., 1 inch) as the removable top panel 112.

In some implementations, the removable top panel 112 may include attachment means, such as perforations 410a-410f (perforations 410d, 410e, and 410f are hidden in FIG. 4 by the channel 404), via which the quick release pin(s) may attach the removable top panel 112 to the enclosure system 102.

In some implementations, the removable top panel 112 may incorporate upgrades such as struts, prop rods or any type of locking mechanism. In some implementations, the enclosure system 102 may be configured to allow a 1 inch high top panel to be replaced with a 3 inch tall top panel or a 6 inch tall top panel. This allows for clearance for popular refrigerators and slide units or the ability to store taller objects, while retaining the same mount points, structural integrity, and the ability to mount objects on top of the enclosure system 102. The taller replacement top panels may have the same construction with side channels and hat channels 406. In some implementations the side channels are thicker (e.g., 3 inches by ½ inch or 6 inches by ½ inch), while the hat channels 406 are 1 inch (or alternatively, 3 inches or 6 inches tall). It should be noted that these measurements are provided only by way of example and that other implementations are possible and contemplated herein. The taller replacement top panels allow larger items, such as refrigerators or large coolers, to fit within interior cavity 120 of the enclosure system 102 and different sized top panels may easily be exchanged using quick-release pins, as described above, without significantly compromising the structural integrity of the enclosure system 102.

Figure 5A:
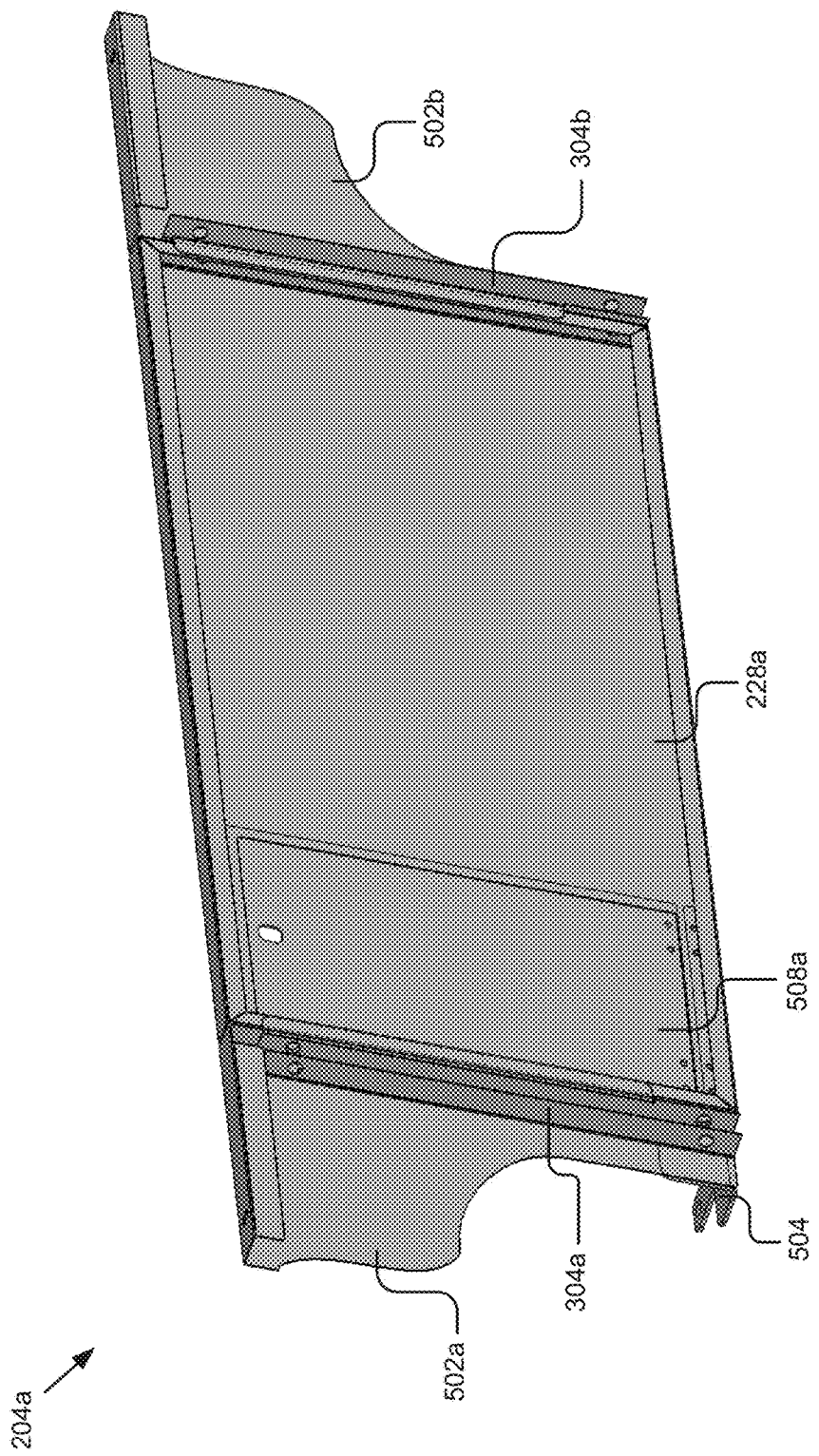
FIGS. 5A-5D are perspective views of example wall systems of the enclosure system.

FIG. 5A is a back perspective view of an example wall system 204a of the enclosure system 102 according to some implementations. In some implementations, the wall system 204 may be coupled with the top system 202 and may include a rigid wall extending between the top system 202 and a floor of the vehicle 104. The wall system 204 may separate the interior cavity 120 or enclosure from a passenger area of the vehicle 104.

The wall system 204a, as illustrated in FIG. 5A, may include a first and second wall frame member 304a and 304b, a first and second wall side skin 502a and 502b, a removable wall panel 228, and, in some implementations, one or more floor brackets 504. The floor brackets may couple the wall system 204 with the vehicle 104 using a vehicle mounting point of the wall system 204, which couples the wall system with, for example, seat bolts or other factory mounting points of the vehicle 104, as described in reference to FIG. 5B. The wall frame members 304 may form a frame structure that allows the removable wall panel 228 to be secured from the interior cavity 120 while being removable, for example, using four quick-release pins. The removable wall panel 228 may include center wall section of the wall system 204 which may be lowered (e.g., pivoted about an axis formed by removable pins) for pass through or removed completely. For example, the removable wall panel 228 may be detachably coupled with the first wall frame member 304a and the second wall frame 304b member by a plurality of quick-release pins.

Figure 8B:
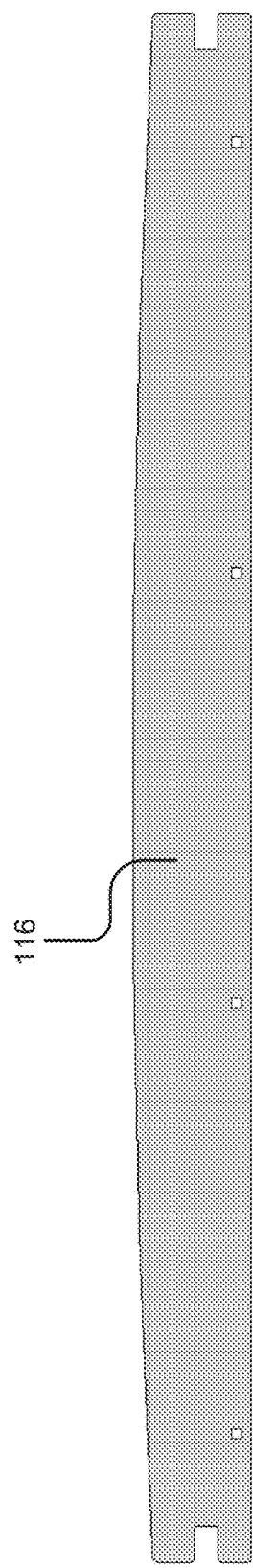
FIG. 8B is top down view of an example top rear skin of the enclosure system.
Figure 8C:
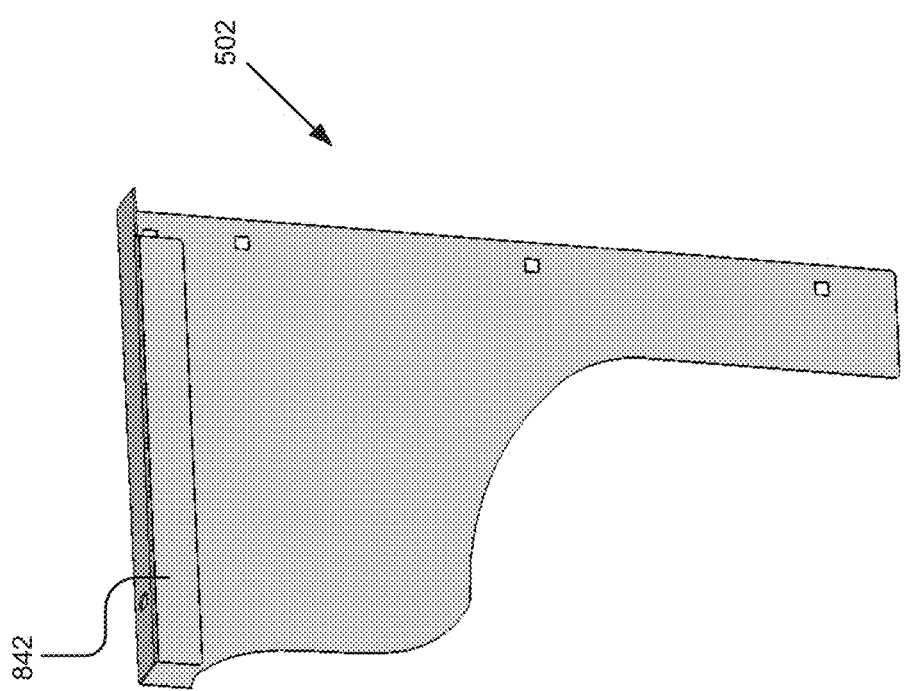
FIG. 8C is back perspective view of an example wall side skin of the enclosure system.

As illustrated in FIG. 8C, the wall side skins 502a and 502b may each include a rigid surface (e.g., a metal plate) extending between a side of the removable wall panel 228 and a side of the vehicle 104 (or a floor, storage compartment, or other contour of the vehicle 104, depending on the implementation. In some implementations, the wall side skins 502 may include a channel 842 bent into the material of the wall side skin 502 at a top portion to serve as a frame member and provide added rigidity to the wall system 204. The wall side skins 502 may be coupled with the wall frame members 304 using fasteners, such as carriage bolts, and, in some implementations, may be attached with the vehicle 104 and/or the top side skins 110 described elsewhere herein. For example, the channel 842 of the wall side skin 502 may be fastened to a top side skin 110 of the enclosure system 102. In some implementations, the wall side skins 502 may be coupled with the wall panel 228 using patch panels 324, as described in below, in reference to FIGS. 5A and 5C.

Returning to FIG. 5A, in some implementations, the removable wall panel 228a may further include an access panel 508a attached to the removable wall panel 228a and covering a passageway through the removable wall panel 228a. For example, the access panel 508a may be positioned within a passage (e.g., a cutout) through the wall panel and may be coupled to the wall panel 228a by a hinge (not shown). The access panel 508a may be shaped to close the passage through the wall panel when the access panel 508a is in a closed position. In some implementations, the access panel 508a may further be coupleable to the wall panel 228a by a locking mechanism for securing the access panel 508a to the wall panel 228a. For example, the access panel 508a may have a key lock.

As illustrated in FIG. 5A, the access panel 508a may be positioned off center in the removable wall panel 228a, so that the access panel 508a may be opened when folding down a rear seat in the vehicle 104 (e.g., when the vehicle 104 has four doors and folding rear seats).

Figure 5B:
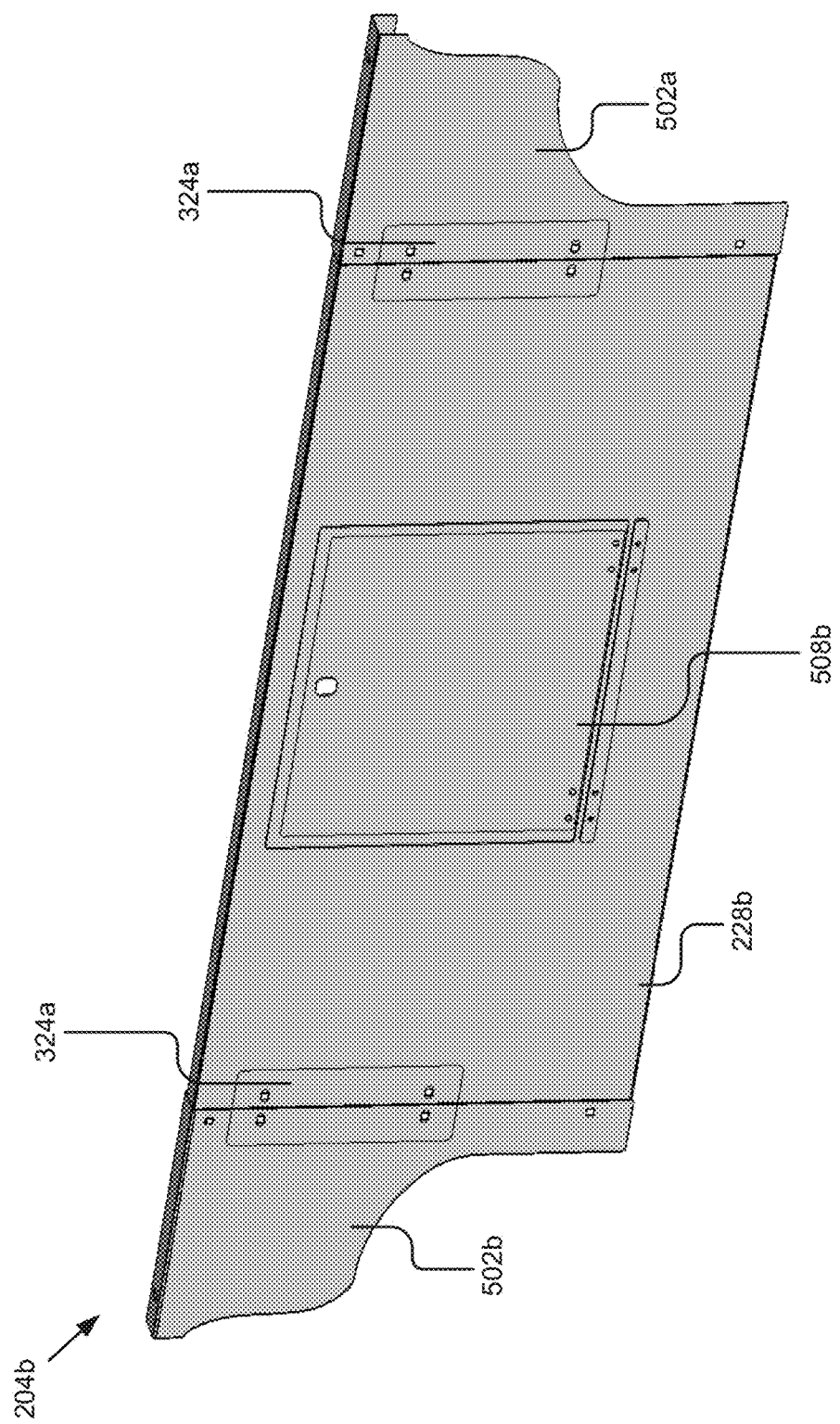

FIG. 5B is a front perspective view of an example wall system 204b of the enclosure system 102 according to some implementations. In the implementation of the access panel 508b and removable wall panel 228b illustrated in FIG. 5B, the access panel 508b may be located near the middle of the removable wall panel 228b to allow the access panel 508b to pass between two seats of the vehicle 104 when open, for example, for a two door vehicle 104 or vehicle 104 with individual seats. As illustrated in FIG. 5B, the wall system 204b may also include patch panels 324a and 324b for attaching the wall panel 228b with the wall side skins 502a and 502b. The patch panels 324 may be attached to the front or the back (e.g., the interior or exterior of the interior cavity 120) of the wall system 204a without departing from this disclosure. Although FIG. 5B illustrates the wall system 204b as including patch panels 324, but no wall frame members 304, it should be understood that the patch panels 324 may be used either separately or in conjunction with the wall frame members 304.

Figure 5C:
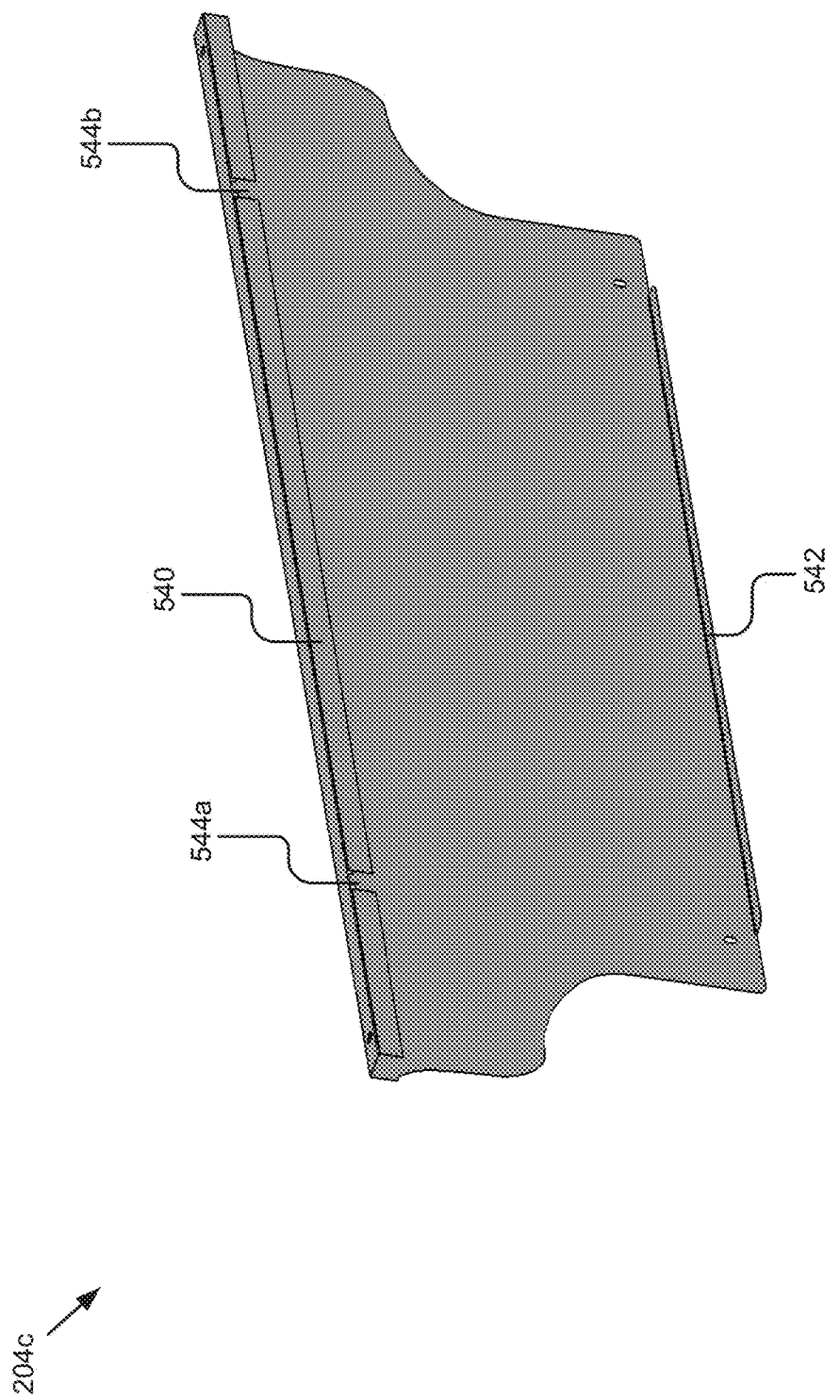

FIG. 5C is a back perspective view of an example wall system 204c of the enclosure system 102, according to some implementations. The implementation of the wall system 204c illustrated in FIG. 5C may not include a removable wall panel 228 removable from the wall system 204c. For example, the wall system 204c may be bolted in to the vehicle 104 and/or enclosure system 102 using carriage bolts or other fasteners. The implementation of the wall system 204 illustrated may be contoured to match the interior contours of the vehicle 104, such that the interior cavity 120 formed by the enclosure system 102 may not be accessed from outside of the interior cavity 120. In some implementations, the wall system 204 may include one or more bends in its material at the top or bottom to form strengthening structures 540 and 542, which provide rigidity to the wall system 204. In some implementations, the wall system 204 may include bolt holes and separations 544a and 544b in the strengthening structure 540 to provide for attachment and/or interaction with the top support members. The wall system 204 may include bolt holes for easily attaching the wall system 204 to the vehicle 104, whether directly or via floor brackets 504 (not shown in FIG. 5C). Although not illustrated in FIG. 5C, the implementation of the wall system 204c may further include an access panel, as illustrated and described in reference to FIGS. 5A and 5B.

It should be understood that, although the wall system 204 is shown as being vertical in the figures herein, it may be configured to be at any angle relative to the vehicle 104 and/or enclosure system 102.

Figure 5D:
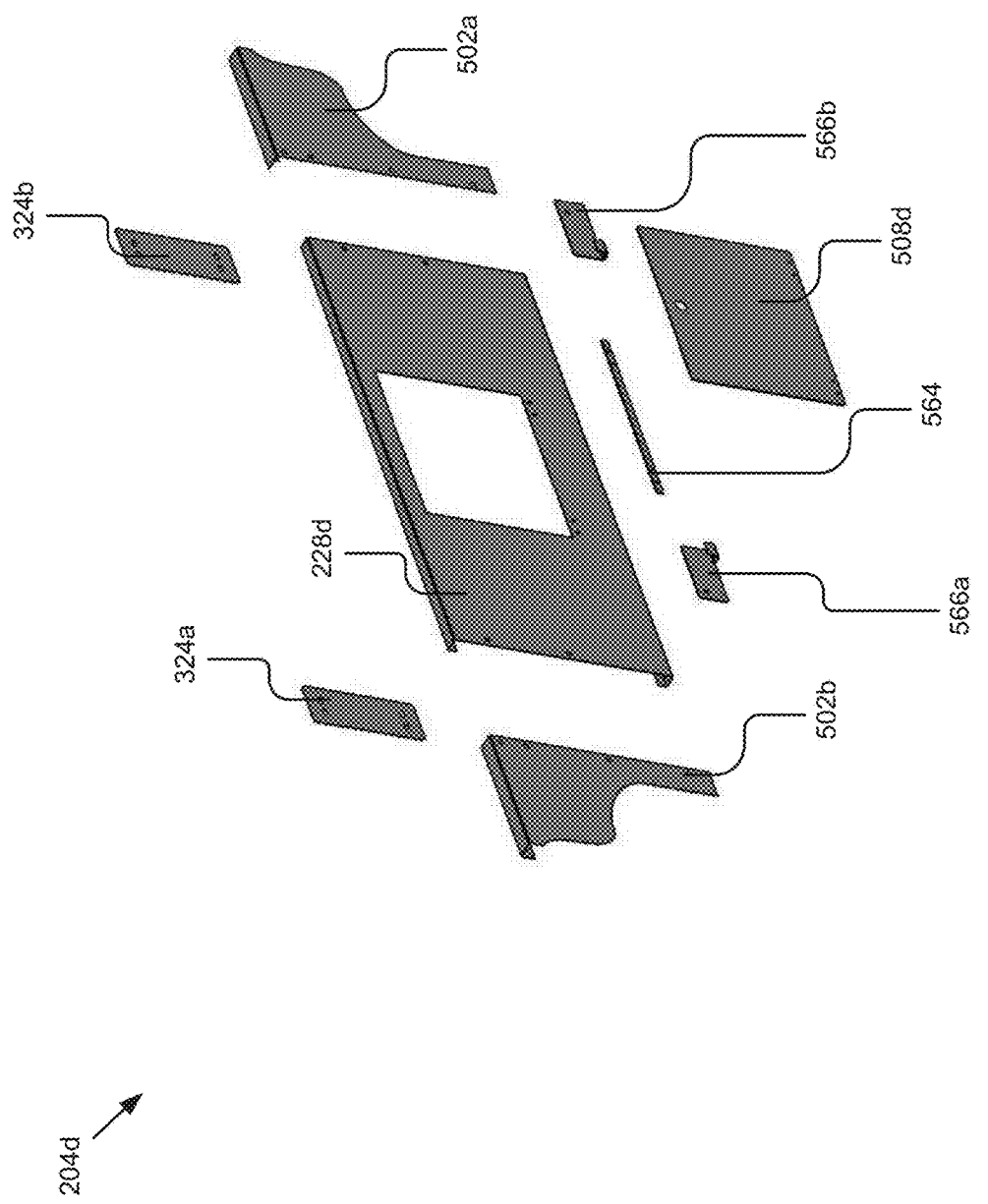

FIG. 5D illustrates an exploded perspective view of an example implementation of a wall system 204d. As illustrated, the wall system 204d may include a wall panel 228d with a passage cutout 562, an access panel 508d, wall side skins 502a and 502b, patch panels 324a and 324b (e.g., as described above), a hinge reinforcement plate 564, and floor brackets 566a and 566b. As illustrated, the access panel 508d may be shaped and sized to cover or fit within the passage cutout 652, depending on the implementation. The hinge reinforcement plate 564 may include a strip of material configured to reinforce a wall panel 228 for hinge(s) connecting a wall panel 228 with an access panel 508.

The floor brackets 566a and 566b are an alternative implementation of the floor brackets (e.g., 504) described elsewhere herein. The floor brackets 566 may attach to the wall side skins 502, the wall panel 228, a wall frame member 304, a patch panel 324, and/or another component of a wall system 204. The floor brackets 566 may include a bracket body and a hook component formed within or coupled to the bracket body. The floor brackets 566 may be configured to hook around a factory floor hoop (not shown). The factory floor hoop may be a mounting location for a back seat of the vehicle 104. Accordingly, the hook component may hook around the factory floor hoop to secure the floor bracket 566 and attached wall system 204 to the vehicle 104. For example, some two door vehicles 104 have a back seat that latches to a factory floor hoop, which factory floor hoop can be used with the floor brackets 566 to attach the wall system 204 to the vehicle.

FIG. 6 is a perspective view of an example wall frame member 304 of the wall system 204 of the enclosure system 102 in a detached position. The wall frame member 304 may have an elongated body 602 and a vehicle mounting point (e.g., 604) adapted to couple the wall frame member 304 with the vehicle 104 (e.g., via a floor bracket 504). In some implementations, the wall frame member 304 may be coupled with a top frame member 220 (e.g., using a carriage bolt), as illustrated in FIG. 3A.

In some implementations, the elongated body 602 of the wall frame member 304 may include a C channel bar having three sides and an opening that, when mounted to the enclosure system 102, faces inward toward the interior cavity 120. In some implementations, the elongated body 602 of the wall frame member 304 may include a lip 606 running along a longitudinal edge of the C channel bar and configured to provide support to a removable wall panel 228 of the wall system 204. In some implementations, the lip 606 may include a foam or rubber strip positioned between the lip 606 and the removable wall panel 228 for noise reduction. In some implementations, the lip 606 includes a gap 610, so that the lip 606 does not extend to the end of the elongated body 602, which gap 610 allows the removable wall panel 228 to pivot without striking the lip 606.

In some implementation, each wall frame member 304 is adapted to allow the removable wall panel 228 to pivot about an axis defined by two quick-release pins, a first quick release pin of the two quick-release pins passing through at least a portion of the elongated body 602 of the wall frame member 304 and an edge of the removable wall panel 228. For example, the quick-release pins may pass through the perforations 608a or 608b of the elongated body of the wall frame member 304. When the quick-release pins are positioned in opposing perforations 608 of the first and second wall frame member 304a and 304b (only one wall frame member 304 is shown in FIG. 6 and, as illustrated in the other figures herein, the wall frame members 304 are mirror images of each other), the quick-release pins provide an axis about which the removable wall panel 228 may pivot into an open position (e.g., when one or more additional quick-release pins are removed that hold the removable wall panel 228 in a closed position to the enclosure system 102).

FIG. 7 is a perspective view of an example top frame member 220 of a top system 202 of the enclosure system 102 in a detached position. The top frame member 220 may have an elongated body 702 and a vehicle mounting point (e.g., 704) adapted to couple the top frame member 220 with the vehicle 104 (e.g., using a support bracket illustrated in FIGS. 11A-11F). In some implementations, the top frame member 220 may be coupled with a wall frame member 304 (e.g., using a carriage bolt), as illustrated in FIG. 3A. In some implementations, the top frame member 220 may be coupled with the wall side skin(s) 502 and/or another component of the wall system 204. It should be noted that only one top frame member 220 is illustrated in FIG. 7, but that a second wall frame member 304 that is a mirror image of the illustrated wall frame member 304 may be included in the enclosure system 102, as illustrated in the other figures of this disclosure.

In some implementations, the elongated body 702 of top frame member 220 includes a bar extending from a first end of the elongated body to a second end of the elongated body and a lip 706 coupled with and extending along at least a portion of a longitudinal edge of the bar. The lip 706 may be adapted to support an edge of the removable top panel 112 such that the top frame member 220 leaves an area between the elongated body 702 of the top frame member 220 and a floor of the vehicle 104 open for receiving cargo. In some implementations, the lip 706 may include a foam or rubber strip positioned between the lip 706 and the removable top panel 112 for noise reduction. In some implementations, the lip 706 includes a gap 710, so that the lip 706 does not extend to the end of the elongated body 702, which gap 710 allows the removable top panel 112 to pivot without striking the lip 706.

In some implementations, the bar includes a C channel having three sides and an opening, the opening of the C channel facing toward the interior cavity 120 of the enclosure system 102 and at least one of the three sides of the C channel having perforations 708a, 708b, or 708c, each of which may be adapted to receive a quick release pin. In some implementations, four quick-release pins (one near or at each corner of the removable top panel 112) may be used to secure the removable top panel 112 to the enclosure system 102.

In some implementations, the top frame members 220 are adapted to allow the removable top panel 112 to pivot about an axis defined by two quick-release pins, a first quick release pin of the two quick-release pins passing through at least a portion of the elongated body 702 of the top frame members 220 and edges of the removable top panel 112.

FIG. 8A is bottom-up perspective view of an example top side skin 110 and security plate 802 (as an implementation of the security plate(s) 240) of the enclosure system 102 shown in a detached position. The top side skin 110 may have different contours and cutouts to fit different vehicles 104 or portions of vehicles 104. It should be understood that although these implementations of top side skins 110 and security plates 802 are shown, other implementations, shapes, uses, quantities, etc., are possible and contemplated herein.

The security plate 802 may be coupled to a rigid surface of the top side skin 110 and may extend from an interior surface of the rigid surface to interact with a side of the vehicle 104 to prevent the top side skin 110 from moving upward, outward, or away from the side of the vehicle 104 thereby exposing the interior cavity 120. For example, the security plate 802, among other functions, prevents the top side skin 110 from being pried open to access the interior cavity 120 formed by the enclosure system 102 and the vehicle 104. The security plate 802 may attach to the top side skin 110 and interact with another secure apparatus, such as the vehicle 104. For example, in the depicted implementation, the shape of the security plate 802 is configured to interact with the factory floating nut plate of hardtop attachment bolts of the vehicle 104. In some instances, the security plate 802 may be configured to sit under a body lip of the vehicle 104, thereby securing the body lip between the security and the top side skin 110.

In some implementations, the security plate 802 may be attached to the top side skin 110, or another component, using carriage bolts. The use of carriage bolts is beneficial because it prevents the security plate 802 from being detached from outside of the interior cavity 120. As indicated in reference to other components of the enclosure system 102, it should be noted that although carriage bolts are described, other fasteners or fastening methods (e.g., welding, integral forming of the security plate 802 with the side skin or other components of the enclosure system 102, etc.) are possible and contemplated herein.

In some implementations, the top side skin 110 may include a hole or cutout 804 configured to permit wiring to pass through. In some instances, the top side skin 110 may include an attached, pivoting wiring closeout cover 242 (not shown), as described in reference to FIG. 2C.

FIG. 8B is top-down view of an example top rear skin 116 of the enclosure system 102 detached from the enclosure system 102. The top rear skin 116 may be attached to the enclosure system 102 via the removable top panel 112 or the rear frame member 222. The top rear skin 116 is configured to enclose the interior cavity 120 adjacent to the rear gate 106. For example, the top rear skin 116 may fill the space between the removable top panel 112 and the rear gate 106 of the vehicle 104. Accordingly, the top rear skin 116 secures the interior cavity 120 and prevents people from reaching within the cavity when the rear gate 106 of the vehicle 104 is closed.

Figure 9:
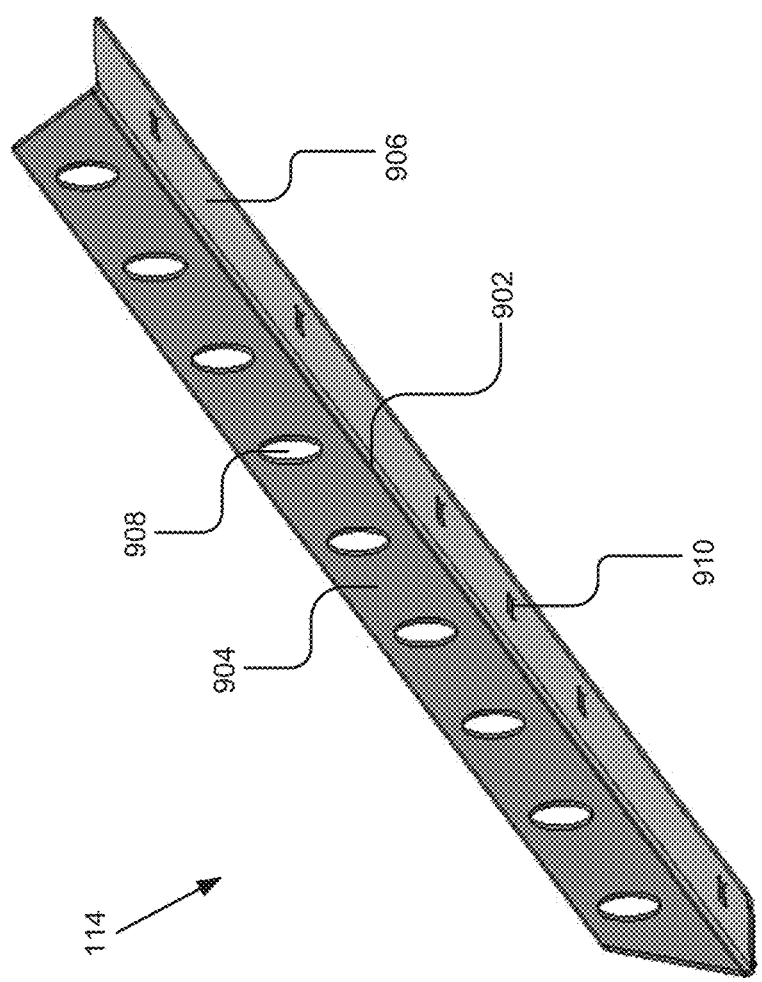
FIG. 9 is a perspective view of a tie down bracket of the enclosure system.

FIG. 9 is a perspective view of a tie down bracket 114 of the enclosure system 102. In some implementations, the tie down bracket 114 may be formed from an elongated metal plate, the elongated metal plate having a longitudinal bend 902 along the length of the elongated metal plate creating a first metal strip 904 perpendicular to a second metal strip 906, the first metal strip 904 and the second metal strip 906 being longitudinally coupled along the longitudinal bend 902. The first metal strip 904 may include a plurality of perforations 908 that may be used to tie objects to the enclosure system 102. For example, in some implementations, a tie down bracket 114 may include 9 one inch holes spaced along the first metal strip 904. In some implementations, the second metal strip 906 may be coupled with a top frame member 220, as discussed in reference to FIG. 1A. For example, the tie down bracket 114 may include pre-drilled bolt holes 910, which mate to corresponding bolt holes in the top frame members 220 or the removable top panel 112, for ease of assembly.

The tie down brackets 114 may extend the full length of the removable top panel 112 (e.g., 25-35 inches, depending on the implementation. The tie down brackets 114 allow gear to be attached on top of the enclosure system 102 (e.g., on the removable top panel 112). Thus, the enclosure system 102 may beneficially use the additional strength formed by its special configuration and components to support items on top of the enclosure system 102.

FIGS. 10A and 10B are side views of example quick-release pins 1002 and 1004 of the enclosure system 102. It should be noted that although these example quick-release pins are illustrated, other types of quick-release pins, such as spring loaded pins or plungers, ball plungers, etc., are possible and contemplated herein.

FIG. 11A is a side view of an example support bracket 224 of the enclosure system 102. The support bracket 224 may couple the enclosure system 102 with the vehicle 104 and provides vertical support to the enclosure system 102. In some implementations, the support bracket 224 may be formed from a metal plate with a perforation 1104 at a first end of the metal plate and a slot 1102 at a second end of the metal plate, the first end of the metal plate opposing the second end of the metal plate. The perforation 1104 at the first end of the metal plate may be adapted to couple with the vehicle mounting point (e.g., 704) of a top frame member 220 and the slot 1102 at the second end of the metal plate adapted to couple with a latch striker plate 122 of the rear gate 106 while the latch striker plate 122 is bolted to the vehicle 104. The support bracket 224 may be adapted to provide vertical support to the top frame member 220.

The example support bracket 224 may extend directly up from the latch striker plate 122 in order to avoid obstructing the opening of the rear gate 106 of the vehicle 104 or the cargo space of the interior cavity 120. For example, the support bracket 224 may be configured to sit behind a latch striker plate 122 and may be attached to one or more of the top frame members 220 and/or the rear frame member 222.

FIGS. 11B-11C are back perspective views of example support brackets 1122a and 1122b (e.g., example implementations of the second support bracket 226) of the enclosure system 102. The example support brackets 1122 described may support a top frame member 220 at a side of the vehicle 104 where the latch striker plate 122 is not present (e.g., the right side of the vehicle 104 in the example illustrated in FIGS. 1A-2B). The support brackets 1122 may provide support to one or more of the top frame members 220 and the rear frame member 222. For example, the support brackets 1122 may be formed from metal plates and may be configured to attach to a factory bolt of the vehicle 104 and to one or more of the top frame members 220 to support the enclosure system 102. The example support brackets 1122a and 1122b are shaped differently as an example of shapes configured to accommodate different vehicles 104 or configurations of the storage area of the vehicle 104.

FIGS. 11D and 11E are perspective views of an example multi-bend support bracket 1142 (e.g., an example implementation of the second support bracket 226) of the enclosure system 102 in a detached position. The multi-bend support bracket 1142 may be configured to support a top frame member 220 or rear frame member 222 of the enclosure system 102. The multi-bend support bracket 1142 may be used in addition to or in place of one or more of the support brackets 1122a and 1122b to provide support for the enclosure system 102.

The multi-bend bracket 1142 may couple a vehicle mounting point of the top frame member 220 (e.g., the second or right top frame member 220b) at a first end 1152 of the multi-bend bracket 1142 with a factory bolt of the vehicle 104 at a second end 1154 of the multi-bend bracket 1142. The multi-bend bracket 1142 may be constructed from a metal plate bent to match to contours of at least a portion of an interior surface of the vehicle 104. The contours illustrated match the right side of a storage compartment of a Jeep Wrangler®, models JK and JKU, however other implementations and contours are possible and contemplated herein for other vehicle 104 models and configurations. For instance, the multi-bend bracket 1142 may be configured to fit the contours of the floor of and/or wall of the vehicle 104 to run between a factory bolt of the vehicle 104 and a top frame member 220 to provide support for the enclosure system 102 without obstructing the opening of the rear gate 106 of the vehicle 104.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above described implementations, implementations, and examples, but by all implementations, implementations, and examples, and other equivalents within the scope and spirit of the invention as claimed.

What is claimed is:

1. An enclosure system for open-top vehicles comprising:
a top system coupleable with an open-top vehicle, the top system forming a top surface among a rear gate of the open-top vehicle, a first side of the open-top vehicle, a second side of the open-top vehicle, and a wall system, the top system, the wall system, the first side, the second side, and the rear gate of the open-top vehicle forming an enclosure, the top system comprising:
a first top frame member including an elongated body, the elongated body of the first top frame member having a vehicle mounting point adapted to couple the first top frame member to the open-top vehicle;
a first rigid surface coupled with the elongated body of the first top frame member and extending from the elongated body of the first top frame member to the first side of the open-top vehicle;
a second top frame member including an elongated body, the elongated body of the first top frame member having a vehicle mounting point adapted to couple the second top frame member with the open-top vehicle;
a second rigid surface coupled with the elongated body of the second top frame member and extending from the elongated body of the second top frame member to the second side of the open-top vehicle; and
a removable top panel including a rectangular body extending between and supported by the elongated body of the first top frame member and the elongated body of the second top frame member, the removable top panel detachably coupled with the first top frame member and the second top frame member using a plurality of quick-release pins; and
the wall system coupled with the top system, the wall system including a rigid wall extending between the top system and a floor of the open-top vehicle and a vehicle mounting point connected to the rigid wall, the wall system separating the enclosure from a passenger area of the open-top vehicle, the vehicle mounting point of the wall system adapted to couple the wall system with the open-top vehicle; wherein the elongated body of the first top frame member includes a bar and a lip coupled with and extending along at least a portion of a longitudinal edge of the bar, the lip adapted to support an edge of the removeable top panel.

2. The enclosure system for open-top vehicles of claim 1, wherein:
the first top frame member and the second top frame member are adapted to allow the removable top panel to pivot about an axis defined by two quick-release pins of the plurality of quick-release pins, a first quick release pin of the two quick-release pins passing through at least a portion of the elongated body of the first top frame member and a first edge of the removable top panel, a second quick release pin of the two quick-release pins passing through at least a portion of the elongated body of the second top frame member and a second edge of the removable top panel.

3. The enclosure system for open-top vehicles of claim 1, wherein:
the wall system includes a removable wall panel, a third rigid surface extending between a first side of the removable wall panel and the first side of the open-top vehicle, and a fourth rigid surface extending between a second side of the removable wall panel and the second side of the open-top vehicle.

4. The enclosure system for open-top vehicles of claim 3, wherein:
the wall system includes a first wall frame member and a second wall frame member, the first wall frame member having an elongated body and a vehicle mounting point adapted to couple the first wall frame member with the open-top vehicle, the second wall frame member having an elongated body and a vehicle mounting point adapted to couple the second wall frame member with the open-top vehicle, the first wall frame member coupled with the first top frame member, and the second wall frame member coupled with the second top frame member.

5. The enclosure system for open-top vehicles of claim 4, wherein:
the removable wall panel is detachably coupled with the first wall frame member and the second wall frame member by a second plurality of quick-release pins.

6. The enclosure system for open-top vehicles of claim 4, wherein:
the first wall frame member and the second wall frame member are adapted to allow the removable wall panel to pivot about an axis defined by two quick-release pins, a first quick release pin of the two quick-release pins passing through at least a portion of the elongated body of the first wall frame member and a first edge of the removable wall panel, a second quick release pin of the two quick-release pins passing through at least a portion of the elongated body of the second wall frame member and a second edge of the removable wall panel.

7. The enclosure system for open-top vehicles of claim 1, further comprising:
a multi-bend bracket coupling the vehicle mounting point of the second top frame member with a factory bolt of the open-top vehicle at a second end of the multi-bend bracket, the multi-bend bracket constructed from a metal plate bent to match to contours of at least a portion of an interior surface of the open-top vehicle.

8. The enclosure system for open-top vehicles of claim 1, wherein:
the removable top panel is interchangable with one or more second removable top panels having different sizes.

9. The enclosure system for open-top vehicles of claim 1, wherein:
the removable top panel is rectangular and includes a metal plate and support structure coupled with the metal plate, the metal plate defining a perimeter edge and being folded along the perimeter edge, the support structure including a hat channel welded to a bottom surface of the metal plate.

10. The enclosure system for open-top vehicles of claim 1, further comprising:
a tie down bracket including an elongated metal plate, the elongated metal plate having a longitudinal bend along a length of the elongated metal plate creating a first metal strip perpendicular to a second metal strip, the first metal strip and the second metal strip being longitudinally coupled along the longitudinal bend, the first metal strip including a plurality of perforations, the second metal strip coupled with one or more of the first top frame member and the second top frame member.

11. The enclosure system for open-top vehicles of claim 1, wherein:
the first rigid surface of the top system is coupled with the first top frame member using carriage bolts, a nut of each of the carriage bolts facing inward toward the enclosure.

12. The enclosure system for open-top vehicles of claim 1, further comprising:
a support bracket including a plate with a perforation at a first end of the plate and a slot at a second end of the plate, the first end of the plate opposing the second end of the plate, the perforation of at the first end of the plate adapted to couple with the vehicle mounting point of the first top frame member, the slot at the second end of the plate adapted to couple with a latch striker plate of the rear gate, the latch striker plate bolted to the open-top vehicle, the support bracket adapted to provide vertical support to the first top frame member.

13. The enclosure system for open-top vehicles of claim 1, further comprising:
a security plate coupled to the first rigid surface, the security plate extending from an interior surface of the first rigid surface and interacting with the first side of the open-top vehicle to prevent the first rigid surface from moving away from the first side of the open-top vehicle.

14. The enclosure system for open-top vehicles of claim 1, wherein:
the wall system includes wall panel and an access panel, the access panel positioned within a passage through the wall panel, the access panel shaped to close the passage through the wall panel when the access panel is in a closed position, the access panel coupled to the wall panel by a hinge, the access panel having a locking mechanism for securing the access panel to the wall panel.

15. An enclosure system for open-top vehicles comprising:
a top system coupleable with an open-top vehicle, the top system forming a top surface among a rear gate of the open-top vehicle, a first side of the open-top vehicle, a second side of the open-top vehicle, and a wall system, the top system, the wall system, the first side, the second side, and the rear gate of the open-top vehicle forming an enclosure, the top system comprising:
a first top frame member including an elongated body, the elongated body of the first top frame member having a vehicle mounting point adapted to couple the first top frame member to the open-top vehicle;
a first rigid surface coupled with the elongated body of the first top frame member and extending from the elongated body of the first top frame member to the first side of the open-top vehicle;
a second top frame member including an elongated body, the elongated body of the first top frame member having a vehicle mounting point adapted to couple the second top frame member with the open-top vehicle;
a second rigid surface coupled with the elongated body of the second top frame member and extending from the elongated body of the second top frame member to the second side of the open-top vehicle; and
a removable top panel including a rectangular body extending between and supported by the elongated body of the first top frame member and the elongated body of the second top frame member, the removable top panel detachably coupled with the first top frame member and the second top frame member using a plurality of quick-release pins; and
the wall system coupled with the top system, the wall system including
a rigid wall extending between the top system and a floor of the open-top vehicle and a vehicle mounting point connected to the rigid wall, the wall system separating the enclosure from a passenger area of the open-top vehicle, the vehicle mounting point of the wall system adapted to couple the wall system with the open-top vehicle;
a first wall frame member and a second wall frame member, the first wall frame member having an elongated body and a vehicle mounting point adapted to couple the first wall frame member with the open-top vehicle, the second wall frame member having an elongated body and a vehicle mounting point adapted to couple the second wall frame member with the open-top vehicle, the first wall frame member coupled with the first top frame member, and the second wall frame member coupled with the second top frame member;
a removable wall panel having a rectangular body and an access panel, the access panel positioned within a passage through the removable wall panel, the access panel shaped to close the passage through the removable wall panel when the access panel is in a closed position, the access panel coupled to the removable wall panel by a hinge, the access panel having a locking mechanism for securing the access panel to the removable wall panel;
a third rigid surface extending between a first side of the removable wall panel and the first side of the open-top vehicle; and
a fourth rigid surface extending between a second side of the removable wall panel and the second side of the open-top vehicle.

16. An enclosure system for open-top vehicles comprising:
a top system coupleable with an open-top vehicle and a wall system, the top system including one or more rigid surfaces forming a top surface among a rear gate of the open-top vehicle, a first side of the open-top vehicle, a second side of the open-top vehicle, and a wall system, the top system, the wall system, the first side, the second side, and the rear gate of the open-top vehicle forming an enclosure; and the wall system coupled with the top system, the wall system including
- a rigid wall extending between the top system and a floor of the open-top vehicle and a vehicle mounting point connected to the rigid wall, the wall system separating the enclosure from a passenger area of the open-top vehicle, the vehicle mounting point of the wall system adapted to couple the wall system with the open-top vehicle;
- a first wall frame member and a second wall frame member, the first wall frame member having an elongated body and a vehicle mounting point adapted to couple the first wall frame member with the open-top vehicle, the second wall frame member having an elongated body and a vehicle mounting point adapted to couple the second wall frame member with the open-top vehicle, the first wall frame member and the second wall frame member coupled with the top system;
- a removable wall panel having a rectangular body and an access panel, the access panel positioned within a passage through the removable wall panel, the access panel shaped to close the passage through the removable wall panel when the access panel is in a closed position, the access panel coupled to the removable wall panel by a hinge, the access panel having a locking mechanism for securing the access panel to the removable wall panel;
- a first rigid surface extending between a first side of the removable wall panel and the first side of the open-top vehicle; and
- a second rigid surface extending between a second side of the removable wall panel and the second side of the open-top vehicle.

17. The enclosure system for open-top vehicles of claim 1, wherein:
the bar includes a C channel having three sides and an opening, the opening of the C channel facing toward the enclosure, at least one of the three sides of the C channel having a perforation adapted to receive a quick release pin of the plurality of quick-release pins.

* * * * *